(12) United States Patent
Fujita

(10) Patent No.: US 8,396,691 B2
(45) Date of Patent: Mar. 12, 2013

(54) POSITION DETECTOR, POSITION DETECTING METHOD, DATA DETERMINATION APPARATUS, DATA DETERMINATION METHOD, COMPUTER PROGRAM, AND STORAGE MEDIUM

(75) Inventor: Osamu Fujita, Kashiwara (JP)

(73) Assignee: Osaka Kyoiku University, Kashiwara-shi (JP)

( * ) Notice: Subject to any disclaimer, the term of this patent is extended or adjusted under 35 U.S.C. 154(b) by 739 days.

(21) Appl. No.: 12/523,986

(22) PCT Filed: Jan. 21, 2008

(86) PCT No.: PCT/JP2008/050708
§ 371 (c)(1),
(2), (4) Date: Jul. 21, 2009

(87) PCT Pub. No.: WO2008/090844
PCT Pub. Date: Jul. 31, 2008

(65) Prior Publication Data
US 2010/0019962 A1    Jan. 28, 2010

(30) Foreign Application Priority Data
Jan. 22, 2007    (JP) .................................. 2007-011942

(51) Int. Cl.
*G06F 11/00* (2006.01)
(52) U.S. Cl. ..................................................... 702/183
(58) Field of Classification Search .................... 702/94, 702/95, 150, 183
See application file for complete search history.

(56) References Cited

U.S. PATENT DOCUMENTS

| | | | |
|---|---|---|---|
| 5,931,890 A | 8/1999 | Suwa et al. | |
| 2003/0004640 A1* | 1/2003 | Vayanos | 701/213 |

FOREIGN PATENT DOCUMENTS

| | | |
|---|---|---|
| JP | 4-29079 | 1/1992 |
| JP | 7-134040 A | 5/1995 |
| JP | 9-230024 A | 9/1997 |
| JP | 11-118512 A | 4/1999 |
| JP | 2000-292547 A | 10/2000 |
| JP | 2001-124840 A | 5/2001 |
| JP | 2001-272466 A | 10/2001 |
| JP | 2002-006898 A | 1/2002 |
| JP | 2002-323551 A | 11/2002 |
| JP | 2003-308600 A | 10/2003 |
| JP | 2004-212070 A | 7/2004 |
| JP | 2004-333279 A | 11/2004 |

(Continued)

*Primary Examiner* — Mohamed Charioui
(74) *Attorney, Agent, or Firm* — Muncy, Geissler, Olds & Lowe, PLLC

(57) ABSTRACT

A controller of a cell phone serving as the position detector reads time-sequentially anteroposterior positional information $P_{i-1}$, $P_{i+1}$, together with interest positional information $P_i$ that is an object of determination (S103), and calculates, for example, vectors $V_1$ and $V_2$ showing a shift from $P_{i-1}$ to $P_i$ and a shift from $P_i$ to $P_{i+1}$, respectively (S104, S105), in order to calculate an amplitude of fluctuation representing a direction of change. The amplitude of fluctuation representing a direction of change is expressed by a value of dot product of the calculated vectors $V_1$ and $V_2$ (S106). When the value of dot product is lower than a predetermined value (S107: YES), a position is shown to greatly deviate in the vicinity of the interest positional information $P_i$. Therefore, the amplitude of fluctuation representing a direction of change is judged to be large, and the positional information is determined to be error (S108).

14 Claims, 14 Drawing Sheets

FOREIGN PATENT DOCUMENTS

| | | |
|---|---|---|
| JP | 2005-156308 A | 6/2005 |
| JP | 2005-309513 A | 11/2005 |
| JP | 2006-270656 A | 10/2006 |
| JP | 2007-248321 A | 9/2009 |

* cited by examiner

FIG. 5

| NUMBER | TIME (SECONDS) | LONGITUDE | LATITUDE | COORDINATE X(m) | COORDINATE Y(m) | INDEX VALUE TC |
|---|---|---|---|---|---|---|
| 001 | 2002 | 487756913 | 125334845 | −331 | −149 | 13415 |
| 002 | 2074 | 487757239 | 125334808 | −230 | −160 | 10076 |
| 003 | 2147 | 487757579 | 125334945 | −125 | −118 | 8904 |
| 004 | 2222 | 487757727 | 125335260 | −79 | −21 | 10229 |
| 005 | 2298 | 487758029 | 125335459 | 14 | 41 | 1172 |
| 006 | 2386 | 487757706 | 125336011 | −86 | 211 | −50433 |
| 007 | 2475 | 487758089 | 125335276 | 32 | −16 | −4239 |
| 008 | 2553 | 487758063 | 125335323 | 24 | −1 | −326 |
| 009 | 2629 | 487758106 | 125335274 | 38 | −16 | −461 |
| 010 | 2703 | 487758120 | 125335385 | 42 | 18 | −167 |
| 011 | 2775 | 487758161 | 125335364 | 55 | 11 | −712 |
| 012 | 2850 | 487757926 | 125335261 | −18 | −20 | −3242 |
| 013 | 2938 | 487758066 | 125335272 | 25 | −17 | 458 |
| 014 | 3014 | 487758093 | 125335365 | 34 | 12 | −305 |
| 015 | 3088 | 487758112 | 125335325 | 40 | −1 | 173 |
| 016 | 3177 | 487758020 | 125335236 | 11 | −28 | 1600 |
| ... | ... | ... | ... | ... | ... | ... |

POSITION DETECTOR, POSITION
DETECTING METHOD, DATA
DETERMINATION APPARATUS, DATA
DETERMINATION METHOD, COMPUTER
PROGRAM, AND STORAGE MEDIUM

This application is the national phase under 35 U.S.C. §371 of PCT International Application No. PCT/JP2008/050708 which has an International filing date of Jan. 21, 2008 and designated the United States of America, and which claims priority to JP 2007-011942.

BACKGROUND OF THE INVENTION

1. Field of the Invention

The present invention relates to a position detector; position detecting method, computer program, and a storage medium storing the computer program that are capable of determining error in each positional information of a movable body which is detected time sequentially, and that are capable of removing, correcting, or complementing the positional information including the error, and relates to a data determination apparatus, data determination method and a computer program that are capable of determining the error not only in the time-sequential positional information but also in each data representing an observed value of sequential variables.

2. Description of Related Art

In recent years, it is known a service that parents are capable of recognizing the present position and the moving locus of their child by having the child carry a cell phone provided with a global positioning system (GPS) function, in order to prevent crimes or to address happened problems easily. Similarly, it is known a service capable of recognizing the present position and the moving locus of a vehicle such as an automobile by having the vehicle provided with a GPS terminal apparatus, in order to address theft.

In the aforementioned services, the GPS terminal apparatus receives time information from GPS satellites, measures a distance from the GPS satellites on the basis of a deviation of the time information and detects own position. Further, in some cases, a position is roughly detected or the detected position is corrected by receiving positional information or correcting information from a base station. The positional information detected by the GPS terminal apparatus is transmitted to a server apparatus and is aggregated for each GPS terminal apparatus. Then, a terminal apparatus connected to the server apparatus acquires the positional information regarding a target GPS terminal apparatus from the server apparatus and outputs to a display apparatus a map image and a position corresponding to the positional information on the map image. In the display apparatus, the position of the movable body is displayed time sequentially on the map image. Therefore, the user visually recognizes the present position and the moving locus of the child, the vehicle, or the like.

However, accuracy of the positional information deteriorates in a belowground shopping mall, in a building, in the shade of a building and the like, because radio waves received from a GPS satellite are weakened in such a place. Thus, there is a problem that calculated positional information represents an abnormal position where the movable body cannot exist. Therefore, a GPS terminal apparatus is known to take into account of a difference between calculated positional information and a true position in accordance with time information received from a GPS satellite, and is known to remove or putatively complement positional information which is estimated to be abnormal information including a significant difference.

Evaluation of difference is generally performed with presuming a model of a true value with respect to a measured value on the basis of assumption that a measured value "y" includes a difference "e" with respect to a true value "x". It is possible to obtain a feasible model by examining a hypothesis of the model of a true value "x" that minimizes the difference "e" with respect to the measured value "y". It is also possible to evaluate that the difference "e" is a difference between a value "x" corresponding to the obtained model and a measured value "y". For example, i-th measured value "yi" in a plurality of measured values is expressed by yi=xi+ei. Then, a linear regression model is assumed, in which "xi" relative to time "t" is expressed by xi=a·ti+b. Regarding the assumed linear regression model, there is a method of calculating an estimated value of "xi" with defining coefficients "a" and "b" so as to minimize the sum of squares (expression 1) in a time distribution of the difference "ei". In this case, the difference "ei" is evaluated by the difference between the measured value "yi" and the estimated value xi=a·ti+b.

(Equation 1)

$$\sum_{i=j}^{k} e_i^2 = \sum_{i=j}^{k} (y_i - a \cdot t_i - b)^2 \qquad (1)$$

Japanese Patent Application Laid-Open No. 2001-272466 discloses a technique wherein when the existence or position of a person or an object other than a vehicle is detected, a linear regression model relative to the measured value is assumed as described above, to thereby smoothen the difference, and putative difference with respect to an estimated position of the object continuously detected thereafter can be reduced.

In addition, it is known a method that is referred to as a Kalman filter for obtaining a statistical estimated value relative to a measured value (Japanese Patent Application Laid-Open No. 2002-6898). It is also known a method of correcting the position of a vehicle with using the Kalman filter in a car navigation system provided to a GPS.

Furthermore, it is disclosed a technique of effectively eliminating an impulse noise that is suddenly generated and using another measured value, with using a method referred to as a median filter in which neighboring measured values of interest measured value are sequentially arranged in a size order and a median value (median) is set as an estimated value (Japanese Patent Application Laid-Open No. 2006-270656).

SUMMARY OF THE INVENTION

In the case of Japanese Patent Application Laid-Open No. 2001-272466, an estimated value is decided depending on the method of assuming the model, although evaluation of differences is possible. Therefore, even when differences are changed in accordance with various factors, such as time-sequential fluctuation, are equally treated, such differences are evaluated after being smoothed in overall. Accordingly, even in a case where a difference is generated suddenly and impulsively, an extremely large difference is allowed to be generated, an assumed model is thereby affected and whole estimated values are also affected. Thus, some differences may be evaluated to be large even when measured values corresponding to such differences actually have only small differences. Therefore, these configurations may involve a problem that an estimated value is more deviated from a true value than the measured value.

Therefore, it may be thought to employ a method of selecting a measured value applied to a model before assuming the model. Specifically, in order to remove the influence of an extremely large difference, a maximum value and a minimum value in the vicinity of an interest measured value are removed, and then a model is applied to decide a coefficient in order to minimize the difference. However, there is no ground for removing the measured values only due to the maximum value or the minimum value. In the case that there are plural measured values with extremely large differences, the influence of the differences cannot be removed even if one maximum value and one minimum value are removed. Further, when the true value is actually fluctuated with a large degree, there is a large variation between the neighboring true values. Therefore, in the case that the position of a movable body is measured in association with the elapsed time, for example, the positions being measured several number of times in an extremely short time are largely fluctuated when the movable body moves with fast speed. However, in such a case, it is difficult to determine whether the difference of the measurement is large or the position is actually fluctuated. In other words, when the true value is actually fluctuated with a large degree, it is difficult to recognize a difference.

Further, when the Kalman filter disclosed in Japanese Patent Application Laid-Open No. 2002-6898 is used, it is required to perform statistical prediction. Thus, a great quantity of calculation is required in order to enhance the statistical accuracy, while such a requirement increases the calculation load. Although a size and a weight of GPS terminal apparatus tend to be reduced, electric power consumption of the GPS terminal increases in proportion to increase of the calculation load, which is contradictory to reducing trend of size and weight.

When the Median filter disclosed in Japanese Patent Application Laid-Open No. 2006-270656 is used, a measured value is utilized that is a median value among neighboring measured values. Thus, it is possible to prevent whole estimated value from being influenced by the measured values including noises that occur suddenly (impulse noise). However, the Median filter is utilized for ignoring the value including a large difference. The Median filter is utilized not for evaluating the level of the difference based on a relation between each measured value and the neighboring measured values.

The present invention was made in view of the above-described circumstances, and has a primary object to provide a position detector, a position detecting method, a computer program that causes a computer to function as a position detector, and a recording medium which are capable of determining that positional information is error which is a detected value including a large difference from a true value because of worse accuracy or the like or is a false detected value, with determining that interest positional information among detected positional information is error when an amplitude of fluctuation representing a direction of change between two of time sequential positional information is larger.

Another object of the present invention is to provide a position detector capable of easily determining error among detected positional information, with utilizing a vector representing a shift between interest positional information and positional information time sequentially previous or subsequent to the interest positional information, and with judging about an amplitude of fluctuation representing a direction of change based on the calculated results of the vector.

Another object of the present invention is to provide a position detector capable of easily determining error among detected positional information in consideration of time required for change, with utilizing a vector representing a shift between interest positional information and positional information time sequentially previous or subsequent to the interest positional information, and with judging about an amplitude of fluctuation representing a direction of change based on the calculated results of the vector after normalizing the vector with the time required for change.

Another object of the present invention is to provide a position detector capable of accurately determining that positional information which largely deviates from plural neighboring positional information in a short time in consideration of time required for change is error, with extracting plural sets of positional information time sequentially previous or subsequent to an interest positional information, and with judging about an amplitude of fluctuation representing a direction of change for each set.

Another object of the present invention is to provide a position detector capable of determining that positional information which shows a change in a short time and shows a correlation coefficient representing a large amplitude of fluctuation about a direction of change with respect to neighboring positional information is error with high possibility, with extracting plural sets of positional information time sequentially previous or subsequent to an interest positional information, with calculating a value corresponding to an amplitude of fluctuation representing a direction of change for each set, and with determining that an interest positional information is error when a correlation coefficient representing a correlation between a value of the amplitude of fluctuation and time required for change is less than a predetermined value.

Another object of the present invention is to provide a position detector capable of determining that a mass of extracted positional information includes many errors, with extracting plural sets of positional information time sequentially previous or subsequent to interest positional information, with calculating a value corresponding to an amplitude of fluctuation representing a direction of change for each set, and with determining error with respect to whole extracted positional information on the basis whether an abundance ratio of positional information judged to have a large amplitude of fluctuation representing a direction of change is no less than a predetermined value or not.

Another object of the present invention is to provide a position detector capable of treating erroneous positional information or positional information including many errors separately from other detected positional information, or capable of removing such positional information from the detected positional information, with determining that such positional information are error information.

Another object of the present invention is to provide a position detector capable of presuming a correct position, with correcting or complementing erroneous positional information or positional information including many errors.

Another object of the present invention is to provide a data determination apparatus, data determination method, and a computer program that causes a computer to function as a data determination apparatus that are capable of determining that data is error which includes a large difference from a true value because of worse accuracy or the like or is false data, with determining that interest data is error when an amplitude of fluctuation representing a direction of change between two of neighboring data is larger.

A position detector according to a first aspect of the invention having a means for time-sequentially detecting positional information of a movable body, includes: a judging means for judging whether or not an amplitude of fluctuation representing a direction of change between a shift from previous positional information to interest positional information among time-sequentially detected positional information and a shift from the interest positional information to subsequent positional information is larger than a given value; and a determining means for determining that the interest positional information is error information about a position of the movable body, when the judging means judges that the amplitude of fluctuation is larger than the given value.

A position detector according to a second aspect of the invention includes: a means for calculating, for the interest positional information, a first vector from a position shown by the previous positional information to a position shown by the interest positional information; a means for calculating a second vector from the position shown by the interest positional information to a position shown by the subsequent positional information; and a calculating means for calculating a dot product of the calculated first vector and the calculated second vector, wherein the judging means judges that the amplitude of fluctuation is larger than the predetermined value, when the dot product calculated by the calculating means is less than a predetermined value.

A position detector according to a third aspect of the invention includes: a means for calculating, for the interest positional information, a first vector from a position shown by the previous positional information to a position shown by the interest positional information; a means for calculating a second vector from the position shown by the interest positional information to a position shown by the subsequent positional information; and a first calculating means for calculating a dot product of the calculated first vector and the calculated second vector; and a second calculating means for dividing the dot product calculated by the first calculating means by elapsed time since a time point corresponding to the previous positional information until a time point corresponding to the interest positional information, and further for dividing by elapsed time since the time point corresponding to the interest positional information until a time point corresponding to the subsequent positional information, wherein the judging means judges that the amplitude of fluctuation is larger than the predetermined value, when the dot product calculated by the second calculating means is less than a predetermined value.

A position detector according to a fourth aspect of the invention includes: a means for extracting, for the interest positional information, plural sets of the previous positional information and the subsequent positional information; and a means for calculating, for each of the extracted plural sets of the previous positional information and the subsequent positional information, a first vector from a position shown by the previous positional information to a position shown by the interest positional information; a means for calculating, for each of the extracted plural sets of the previous positional information and the subsequent positional information, a second vector from the position shown by the interest positional information to a position shown by the subsequent positional information; and a first calculating means for calculating, for each of the extracted plural sets of the previous positional information and the subsequent positional information, a dot product of the calculated first vector and the calculated second vector; a second calculating means for dividing, for each of the extracted plural sets of the previous positional information and the subsequent positional information, the dot product calculated by the first calculating means by elapsed time since a time point corresponding to the previous positional information until a time point corresponding to the interest positional information, and further for dividing by elapsed time since the time point corresponding to the interest positional information until a time point corresponding to the subsequent positional information; and a third calculating means for calculating, for all the plural sets, a mean value of the divided results by the second calculating means, wherein the judging means judges that the amplitude of fluctuation is larger than the predetermined value, when the mean value calculated by the third calculating means is less than a predetermined value.

A position detector according to a fifth aspect of the invention includes: a means for extracting, for the interest positional information, plural sets of the previous positional information and the subsequent positional information; and a means for calculating, for each of the extracted plural sets of the previous positional information and the subsequent positional information, a first vector from a position shown by the previous positional information to a position shown by the interest positional information; a means for calculating, for each of the extracted plural sets of the previous positional information and the subsequent positional information, a second vector from the position shown by the interest positional information to a position shown by the subsequent positional information; and a first calculating means for calculating, for each of the extracted plural sets of the previous positional information and the subsequent positional information, a dot product of the calculated first vector and the calculated second vector; a second calculating means for multiplying, for each of the extracted plural sets of the previous positional information and the subsequent positional information, elapsed time since a time point corresponding to the previous positional information until a time point corresponding to the interest positional information by elapsed time since the time point corresponding to the interest positional information until a time point corresponding to the subsequent positional information; and a third calculating means for calculating, for all the plural sets, a correlation coefficient between the dot products calculated by the first calculating means and the multiplied results by the second calculating means, wherein the judging means judges that the amplitude of fluctuation is larger than the predetermined value, when the correlation coefficient calculated by the third calculating means is less than a predetermined value.

A position detector according to a sixth aspect of the invention includes: an extracting means for extracting time-sequentially successive positional information from the detected positional information; and a means for calculating, for each of the extracted positional information by the extracting means, a first vector from a position shown by the previous positional information to a position shown by the interest positional information; a means for calculating, for each of the extracted positional information by the extracting means, a second vector from the position shown by the interest positional information to a position shown by the subsequent positional information; and a first calculating means for calculating a dot product of the calculated first vector and the calculated second vector; and a second calculating means for dividing the dot product calculated by the first calculating means by elapsed time since a time point corresponding to the previous positional information until a time point corresponding to the interest positional information, and further for dividing by elapsed time since the time point corresponding to the interest positional information until a time point corresponding to the subsequent positional information; wherein the judging means including: a means for judging, for each of the extracted positional information by the extracting means, whether or not the divided results by the second calculating means is below a predetermined value; and a third calculating means for calculating a ratio of the positional information judged as being below the predetermined value with respect to an entirety of the extracted positional information; when the ratio calculated by the third calculating means is judged as being no less than a predetermined ratio, the amplitude of fluctuation for the entirety of the extracted positional information is larger than the given value; and the determining means determines that the entirety of the positional information extracted by the extracting means is error information, when the amplitude of fluctuation for the entirety of the extracted positional information is judged to be larger than the given value.

A position detector according to a seventh aspect of the invention includes: a means for storing the positional information determined to be error information by the determining means as invalid positional information.

A position detector according to an eighth aspect of the invention includes: a means for calculating a median value or a mean value of a predetermined plural positional information located in the vicinity of the positional information determined to be error information by the determining means; and a means for correcting or complementing the positional information determined to be error information with using the calculated median value or the calculated mean value.

A position detecting method according to a ninth aspect of the invention is for time-sequentially detecting positional information of a movable body and includes the steps of: judging whether or not an amplitude of fluctuation representing a direction of change between a shift from previous positional information to interest positional information among time-sequentially detected positional information and a shift from the interest positional information to subsequent positional information is larger than a given value; and determining that the interest positional information is error information about a position of the movable body, when the judging means judges that the amplitude of fluctuation is larger than the given value.

A computer program according to a tenth aspect of the invention is for causing a computer to execute the steps of receiving positional information of a movable body in association with time information, and the program causes the computer to execute the steps of: judging whether or not an amplitude of fluctuation representing a direction of change between a shift from previous positional information to interest positional information among received positional information and a shift from the interest positional information to subsequent positional information is larger than a given value; and determining that the interest positional information is error information about a position of the movable body, when the amplitude of fluctuation is judged to be larger than the given value.

A recording medium according to an eleventh aspect of the invention is computer-readable and has recorded therein a computer program for causing a computer to execute the steps of receiving positional information of a movable body in association with time information, and the computer program causes the computer to execute the steps of: judging whether or not an amplitude of fluctuation representing a direction of change between a shift from previous positional information to interest positional information among received positional information and a shift from the interest positional information to subsequent positional information is larger than a given value; and determining that the interest positional information is error information about a position of the movable body, when the amplitude of fluctuation is judged to be larger than the given value.

A data determination apparatus according to a twelfth aspect of the invention includes a judging means for judging whether or not an amplitude of fluctuation representing a direction of change between a shift to an interest variable of interest data among the each data from another variable of data in the neighborhood of the interest variable and a shift from the interest variable of interest data to other variable of data in the neighborhood of the interest variable; and a determining means for determining that the interest data is error data, when the amplitude of fluctuation is judged to be larger than the given value.

A data determination method according to a thirteenth aspect of the invention is for determining an error of each data on variables and includes the steps of: judging whether or not an amplitude of fluctuation representing a direction of change between a shift to an interest variable of interest data among the each data from another variable of data in the neighborhood of the interest variable and a shift from the interest variable of interest data to other variable of data in the neighborhood of the interest variable is larger than a given value; and determining that the interest data is error data, when the amplitude of fluctuation is judged to be larger than the given value.

A computer program according to a fourteenth aspect of the invention is for causing a computer to determine an error of each data on variables, and the program causes the computer to execute the steps of: judging whether or not an amplitude of fluctuation representing a direction of change between a shift to an interest variable of interest data among the each data from another variable of data in the neighborhood of the interest variable and a shift from the interest variable of interest data to other variable of data in the neighborhood of the interest variable; and determining that the interest data is error data, when the amplitude of fluctuation is judged to be larger than the given value.

In the present invention, regarding interest positional information, it is judged whether or not an amplitude of fluctuation representing a direction of change between a shift to interest positional information among time-sequentially detected positional information from previous positional information and a shift from the interest positional information to subsequent positional information is larger than a given value. When the amplitude of fluctuation representing a direction of change is judged to be large, the interest positional information is determined to be error information. Note that the previous positional information is not limited to be time sequential information immediately prior to the interest positional information, and similarly the subsequent positional information is not limited to be time sequential information immediately subsequent to the interest positional information.

In the present invention, regarding an interest positional information, calculation is performed for a dot product (scalar product) of a first vector expressing the shift from a position shown by previous positional information to a position shown by interest positional information and a second vector expressing the shift from the position shown by the interest positional information to a position shown by subsequent positional information, and the calculated dot product is treated as a value corresponding to the amplitude of fluctuation representing a direction of change. When a value of the dot product is below a predetermined value, the amplitude of fluctuation representing a direction of change is judged to be large, and the interest positional information is determined to be information falsely showing a position of a movable body.

In the present invention, regarding interest positional information, calculation is performed for a dot product (scalar product) of a first vector expressing the shift from a position shown by previous positional information to a position shown by interest positional information and a second vector expressing the shift from the position shown by the interest positional information to a position shown by subsequent positional information, and further the calculated dot product is divided by the time required for each shift. The divided value is treated as the value corresponding to the amplitude of fluctuation representing a direction of change, and when this value is below a predetermined value, the amplitude of fluctuation representing a direction of change is judged to be large, and the interest positional information is determined to be information falsely showing a position of a movable body.

In the present invention, regarding interest positional information, a combination of previous positional information and subsequent positional information is extracted, calculation for the combination is performed for a dot product (scalar product) of a first vector expressing the shift from a position shown by the previous positional information to a position shown by the interest positional information and a second vector expressing the shift from the position shown by the interest positional information to a position shown by the subsequent positional information, and further the calculated dot product is normalized by the time required for each shift. The value of the normalized dot product is treated as a value corresponding to the amplitude of fluctuation representing a direction of change, and when this value is smaller than a predetermined value, the amplitude of fluctuation representing a direction of change is judged to be large in the vicinity of the interest positional information, and the interest positional information is determined to be error information.

In the present invention, regarding interest positional information, a plurality of previous positional information and subsequent positional information are extracted, and calculation with treating each of extracted positional information as interest positional information is performed for a dot product (scalar product) of a first vector expressing the shift from a position shown by the previous positional information to a position shown by the interest positional information and a second vector expressing the shift from the position shown by the interest positional information to a position shown by the subsequent positional information. Regarding each of the extracted positional information, further calculation is performed for a correlation coefficient between the calculated dot product and the time required for the shift. The calculated correlation coefficient is treated as the value corresponding to the amplitude of fluctuation representing a direction of change, and when this value is smaller than a predetermined value the amplitude of fluctuation representing a direction of change is judged to be large with respect to the entire neighboring interest positional information, and the interest positional information is determined to be an error information.

In the present invention, time-sequential positional information are extracted, and calculation with treating each of extracted positional information as interest positional information is performed for a dot product (scalar product) of a first vector expressing the shift from a position shown by previous positional information to a position shown by interest positional information and a second vector expressing the shift from the position shown by the interest positional information to a position shown by the subsequent positional information, and further the calculated dot product is normalized by the time required for each shift. Regarding each of the extracted positional information, it is judged whether or not the normalized dot product is below a predetermined value, and the ratio with respect to the entire extracted positional information is calculated of the positional information judged to be below the predetermined value. The calculated ratio is treated as the value corresponding to the amplitude of fluctuation representing a direction of change, and it is judged whether or not this ratio is no less than a predetermined ratio. When it is judged that this ratio is no less than a predetermined ratio, the entire extracted positional information is judged to include large amplitude of fluctuation representing a direction of change and is determined to be error information.

In the present invention, positional information that have been determined to be error information are stored as invalid positional information of a movable body.

In the present invention, positional information that have been determined to be error information are corrected or complemented with a median value or a mean value of a plurality of positional information time-sequentially neighboring.

In the present invention, it is judged whether or not the amplitude of fluctuation representing a direction of change between a shift to an interest variable of interest data among each data from another variable of data in the neighborhood of the interest variable and a shift from the interest variable of interest data to other variable of data in the neighborhood of the interest variable is larger than a predetermined value. When the amplitude of fluctuation representing a direction of change is judged to be large, the interest data is determined to be error data.

According to the present invention, the interest positional information showing an intermediate point between the position shown by the previous positional information and the position shown by the subsequent positional information of the movable body has largely altered direction of change, when a detected value deviates from the previous positional information to the interest positional information due to inferior detection accuracy and the deviation cancels the shift from the interest positional information to the subsequent positional information. Therefore, the position detector can judge that the amplitude of fluctuation representing a direction of change is large and can determine the detected value including a large difference or a false detected value as error. Note that the present invention is not limited to such positional information. The present invention is also applicable to error determination of an observed value such as another measured value or detected value, with judging whether or not the amplitude of fluctuation representing a direction of change between the shifts from interest value, among sequentially observed values such as another measured values or detected values, to two values sequential to the interest value is large.

According to the present invention, when interest positional information is expressed by a detected value including a large difference due to inferior accuracy or another factor or a false detected value, and when detected values greatly deviate from previous positional information to the interest positional information and the deviation cancels the shift from the interest positional information to subsequent positional information, a dot product of a vector expressing each shift shows a smaller (negative) value than a predetermined value. Therefore, a position detector can judge that the amplitude of fluctuation representing a direction of change is large and can easily determine that the interest positional information is error information.

According to the present invention, when interest positional information is expressed by a detected value including a large difference due to inferior accuracy or another factor or a false detected value, and when detected values greatly deviate from previous positional information to the interest positional information in a short time and the deviation cancels the shift from the interest positional information to subsequent positional information, a dot product of vectors expressing the shifts shows a smaller (negative) value in inversely proportion to an absolute value that shows larger amount as the shift occurs in a shorter time. Therefore, a position detector can judge that the amplitude of fluctuation representing a direction of change is large, and can determine the interest positional information to be error information.

According to the present invention, when the interest positional information is expressed by a detected value including a large difference due to inferior accuracy or another factor or a false detected value, and when the detected value deviates in a short time and the deviation cancels the shift to a direction shown by the interest positional information from a direction shown by previous positional information and the shift from the direction shown by the interest positional information to a direction shown by subsequent positional information, a mean value of the values obtained by dividing a dot product of vectors expressing the shifts by the time required for the shifts is lower than a predetermined value. Therefore, a position detector can judge that the amplitude of fluctuation representing a direction of change is large and can accurately determine positional information, which greatly deviates with respect to plural neighboring positional information in a short time, to be error information.

According to the present invention, when interest positional information is expressed by a detected value including a large difference due to inferior accuracy or another factor or a false detected value, and when the detected value deviates from precious positional information to the interest positional information and the deviation cancels the shift from the interest positional information to subsequent positional information, a correlation is generated that shows large amplitude of fluctuation representing a direction of change in a short time required for the shift and is shown by a negative correlation coefficient. Therefore, a position detector can judge that the amplitude of fluctuation representing a direction of change is large and can recognize error information, with calculating the correlation coefficient expressing the correlation between a dot product of the vectors showing a directional shift from a position shown by the previous positional information to a position shown by the interest positional information and a directional shift from the position shown by the interest positional information to a position shown by the subsequent positional information, and the time required for the shifts.

According to the present invention, when a detected value regarding successive positional information deviates from precious positional information to interest positional information and the deviation frequently cancels the shift from the interest positional information to subsequent positional information, it is increased an existence ratio of positional information that is judged to have a large amplitude of fluctuation representing a direction of change, with respect to the whole extracted positional information. Therefore, a position detector can determine an area corresponding to the extracted positional information to be an area including many errors.

According to the present invention, when detected positional information are utilized, positional information being determined to be error are stored as invalid information. Thus, it is possible to treat the positional information being determined to be error separately from other positional information, and for example, it is possible to remove the positional information being determined to be error from the detected positional information.

According to the present invention, when detected positional information are utilized, it is possible to correct or complement positional information being determined to be error with another positional information neighboring the positional information being determined to be error.

According to the present invention, when an interest data to be processed greatly deviates from the neighboring data due to inferior observation accuracy, and when the deviation cancels a shift from the interest data to another neighboring data, the shift trend is largely fluctuated. Therefore, it is possible to determine data having no sequential value with respect to the direction of change based on the neighboring data, to be data including large difference or false data, although true values are estimated to be sequentially changed.

The above and further objects and features of the invention will more fully be apparent from the following detailed description with accompanying drawings.

BRIEF DESCRIPTION OF THE DRAWINGS

FIG. 5 is an explanatory view showing examples of positional information temporarily stored in a storage section of the cell phone according to the embodiment 1 of the present invention and a calculated index value TC.

DESCRIPTION OF THE PREFERRED EMBODIMENTS

The present invention will be specifically described hereinafter with reference to the drawings showing embodiments of the invention.

Description will be given below with a cell phone having a GPS function for detecting positional information showing a self position, as an example of a position detector according to the present invention.

Embodiment 1

Figure 1:
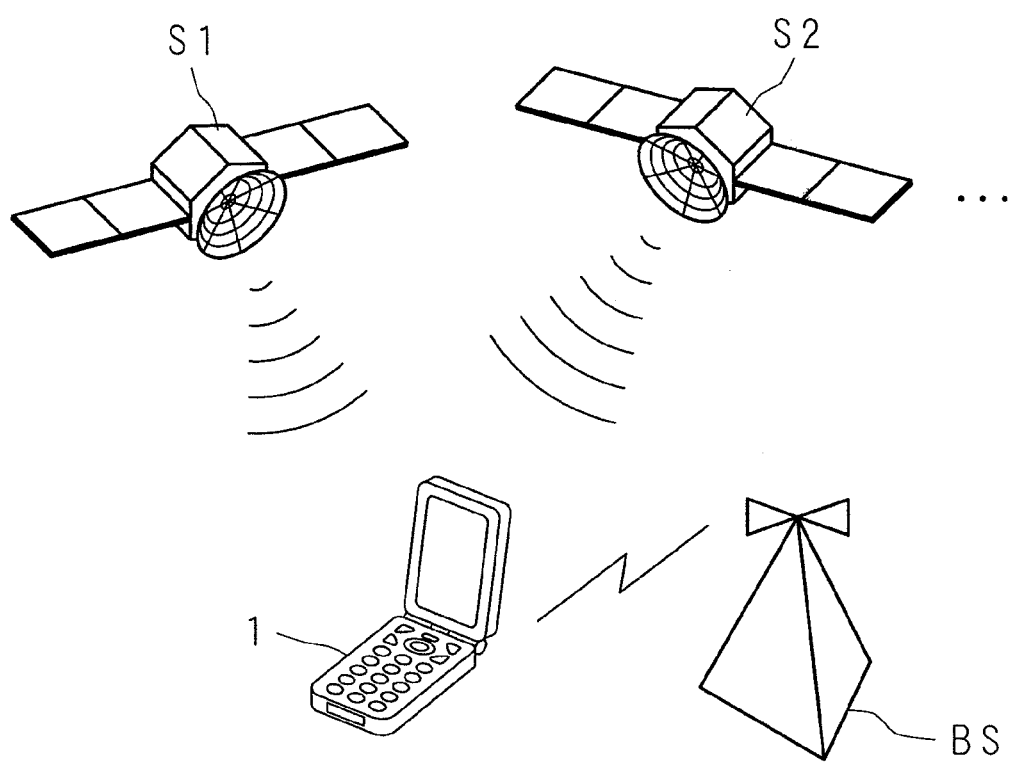
FIG. 1 is a configuration diagram schematically showing a mechanism of detecting positional information with using a cell phone according to the present invention.

FIG. 1 is a configuration diagram schematically showing a mechanism of detecting positional information with using a cell phone according to the present invention. A cell phone 1 has a GPS function, in addition to a telephone function, of transmitting and receiving radio waves to/from a base station BS and detects a self position based on time information transmitted at predetermined intervals from GPS satellites S1, S2, . . . . Note that the cell phone 1 may also transmit the positional information showing the detected position to a server apparatus (not shown) via the base station BS.

In a case that a position is detected on the basis of the time information transmitted from the GPS satellites S1, S2, . . . , the cell phone 1 can detect the position with high accuracy when the radio waves from the GPS satellites S1, S2, . . . can be successfully received. However, when the radio waves from the GPS satellites cannot be successfully received, e.g., in a case of a bad weather or in a case that the cell phone 1 is in a building, the detected positional information frequently includes error and the amount of this error becomes large.

In the embodiment 1 described below, it is focused on a shift trend of data in a case of observing the detected positional information based on the time information received from the GPS satellites S1, S2, . . . , the shift trend with respect to the time-sequentially anteroposterior positional information is quantitatively evaluated, the amount of error of each detected positional information is individually evaluated, and then determination is performed for positional information including large error. Then, the positional information including large error is removed, and a moving locus of the cell phone 1 is specified only from the positional information that is accurately detected. These configurations focus on interest positional information with the time-sequential shift trend to another positional information subsequent to the interest positional information. Thus, the error of the interest positional information cannot be evaluated at least until the subsequent positional information is detected. However, the positional detection described below has an object of enhancing the accuracy of the locus of a specified movement, with recognizing positional information having large error among the detected positional information, rather than with sequentially specifying the locus of the movement in order to emphasize real-time performance.

Specifically, in the embodiment 1, it is possible to use the cell phone 1 for specifically and accurately tracking a human motion carrying the cell phone 1 in order to address after a problem happens, through accumulating the positional information of the cell phone 1 detected by the cell phone 1 in the server apparatus described above. Further, it is possible to accurately determine and identify positional information including large error among the positional information detected by the cell phone 1, even when the cell phone 1 is indoors. Therefore, the cell phone 1 can be used in various purposes, such as for accurately specifying the time point when the cell phone 1 being indoors goes outside. Hereinafter, it will be described in detail about the configuration and processing to implement highly accurate determination of error in the positional information detected by the cell phone 1 on the basis of the time information received from the GPS satellites S1, S2, . . . .

Figure 2:
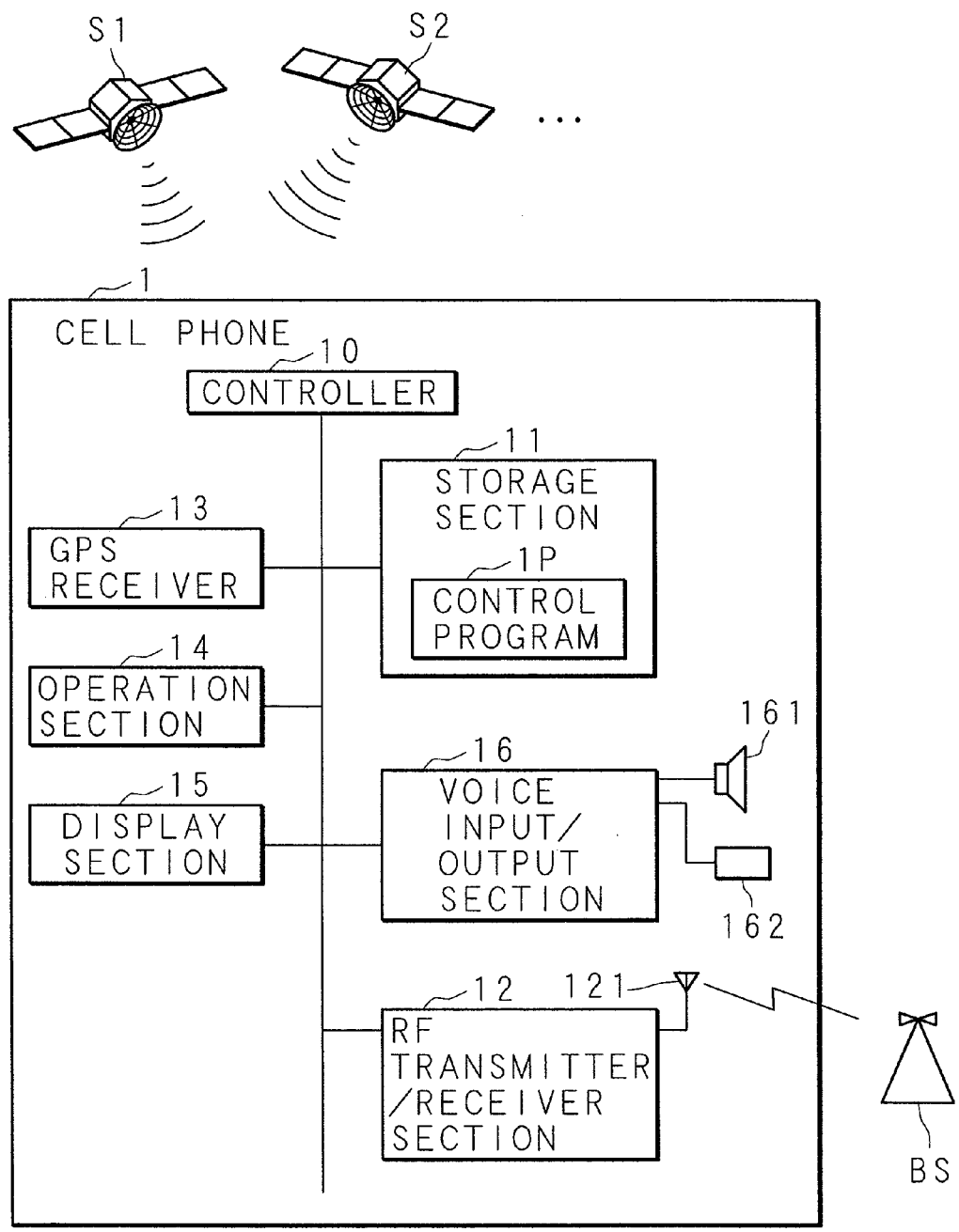
FIG. 2 is a block diagram showing an internal structure of the cell phone according to the present invention.

FIG. 2 is a block diagram showing an internal structure of the cell phone 1 according to the present invention. The cell phone 1 includes: a controller 10 that controls the operation of each constitutional part described below; storage section 11 having a nonvolatile memory such as an EEPROM (Electrically Erasable Programmable Read Only Memory) and a volatile memory such as a RAM (Random Access Memory); RF (Radio Frequency) transmitter/receiver section 12 that transmits and receives radio waves to/from the base station BS; GPS receiver 13 that receives signals from the GPS satellites S1, S2, . . . ; operation section 14 having buttons such as numeric keypads; display section 15 having a liquid crystal panel or the like; and a voice input/output section 16 having a speaker 161 and a microphone 162.

The nonvolatile memory of the storage section 11 of the cell phone 1A stores a control program 1P for activating the cell phone 1. The controller 10 of the cell phone 1 controls each constitutional part by reading the control program 1P from the storage section 11 and executing this control program 1P. Note that the control program 1P may be previously stored in a ROM (not shown) incorporated in the controller 10 or may be downloaded from a server apparatus (not shown). Further, various kinds of information such as telephone number are stored in the nonvolatile memory such as an EEPROM of the storage section 11 of the cell phone 1. Temporarily generated information by the processing of the controller 10 is stored in the volatile memory such as a RAM of the storage section 11 of the cell phone 1. Furthermore, the controller 10 of the cell phone 1 temporarily stores the positional information detected by the GPS receiver 13 described later, in the storage section 11.

The RF transmitter/receiver section 12 implements transmitting and receiving of radio waves to/from the base station BS via an antenna 121, and the controller 10 of the cell phone 1 performs communication such as transmitting and receiving of signals expressing speech voice and other data with using the RF transmitter/receiver section 12.

The GPS receiver 13 receives radio waves transmitted from the GPS satellites S1, S2, . . . , every time a predetermined period is elapsed, such as 10 seconds. The GPS receiver 13 calculates a distance from the GPS satellites S1, S2, . . . to detect longitude and latitude on the basis of the time information carried on the radio waves, and then transmits to the controller 10 the detected results as the positional information. In addition, the GPS receiver 13 transmits to the controller 10 the time information carried on the radio waves together with the positional information.

The voice input/output section 16 decodes the speech voice received through the RF transmitter/receiver section 12 by the controller 10, then outputs a voice through the speaker 161. Further, the voice input/output section 16 performs processing of encoding the voice inputted by the microphone 162. The controller 10 transmits an encoded voice signal to the base station BS through the RF transmitter/receiver section 12.

The controller 10 of the cell phone 1 receives the operation of a user through the operation section 14, and displays a number, text such as an icon, and an image on the display section 15.

When the cell phone 1 described above is moved indoor such as a school or a company building, the strength of the radio waves that can be received from the GPS satellites S1, S2, . . . is weakened. Furthermore, when the cell phone 1 is moved into a forest of buildings or a complex area of buildings such as an area below an express highway, the radio waves from the GPS satellites S1, S2, . . . may be reflected. In such a case, the positional information on the longitude/latitude detected by the GPS receiver 13 of the cell phone 1 may include a large difference or false information.

The controller 10 of the cell phone 1 according to the present invention applies determination processing to determine error of the positional information detected by the GPS receiver 13. Furthermore, the controller 10 of the cell phone 1 temporarily stores the positional information transmitted from the GPS receiver 13 in the storage section 11 time-sequentially, and performs judgment processing to judge an amplitude of fluctuation representing a direction of change between a shift to interest positional information from previous positional information and a shift from the interest positional information to subsequent positional information. Hereinafter, it will be described about the judgment processing and the determination processing performed by the controller 10 of the cell phone 1.

Figure 3:
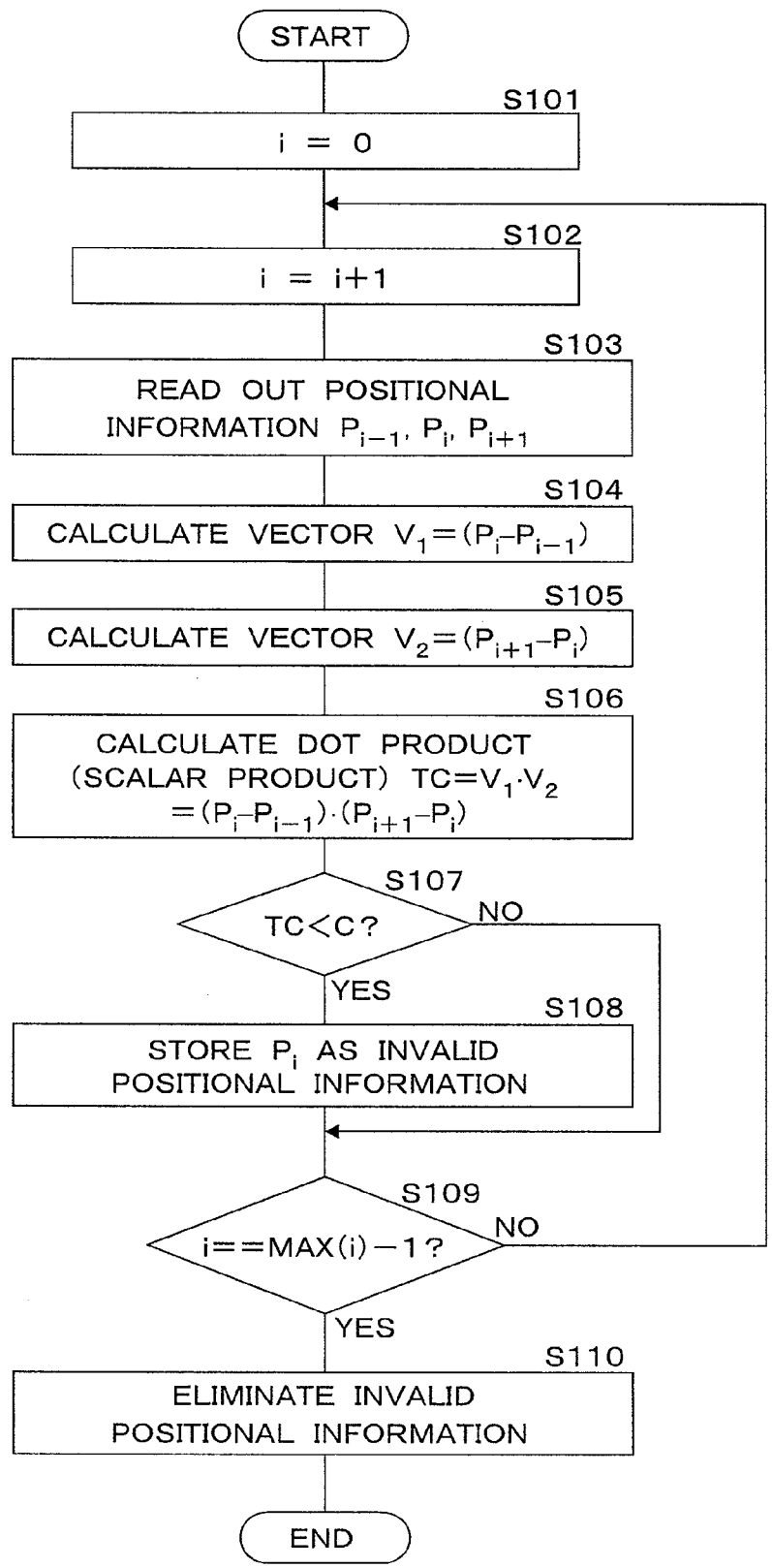
FIG. 3 is a flowchart showing a procedure of judgment processing and determination processing performed by a controller of the cell phone according to an embodiment 1 of the present invention.

As described above, the controller 10 of the cell phone 1 temporarily stores in the storage section 11 positional information that are detected by the GPS receiver 13 every time of elapsing predetermined period. The controller 10 of the cell phone 1 applies a number "i" to the positional information in accordance with time-sequential order to store the positional information in association with the numbers "i", in order to later read out the positional information stored in the storage section 11 in an ascending order of the time being one-dimensional variable. The controller 10 of the cell phone 1 reads out i-th positional information and the anteroposterior positional information to the i-th positional information from the storage section 11 and performs the judgment processing and the determination processing to the i-th positional information. FIG. 3 is a flowchart showing the procedure of the judgment processing and the determination processing performed by the controller 10 of the cell phone 1 according to the embodiment 1 of the present invention.

The controller 10 of the cell phone 1 assigns 0 to the number "i" (step S101), adds 1 to the number "i" (step S102) and reads out positional information $P_{i-1}$, $P_i$, $P_{i+1}$ (step S103), in order to read out positional information in time sequential order. Note that the positional information $P_i$ shows a vector having variables according to longitude and latitude.

Next, the controller 10 of the cell phone 1 calculates, for the interest positional information $P_i$ to be determined, a vector $V_1=(P_i-P_{i-1})$ showing a shift, in other words, a movement from the previous positional information $P_{i-1}$ to the interest positional information $P_i$ (step S104). Further, the controller 10 calculates a vector $V_2=(P_{i+1}-P_i)$ showing a shift, in other words, a movement from the interest positional information $P_i$ to the subsequent positional information $P_{i+1}$ (step S105).

The controller 10 of the cell phone 1 calculates a dot product (scalar product) $TC=V_1 \cdot V_2=(P_i-P_{i-1}) \cdot (P_{i+1}-P_i)$ of the vectors $V_1$ and $V_2$ calculated in step S104 and step S105 (step S106). Note that the dot product may be calculated in accordance with, instead of the calculation of TC in steps S104 to S106, a calculating equation $TC=P_{i-1} \cdot P_i+P_i \cdot P_{i+1}-P_{i-1} \cdot P_{i+1}-P_i \cdot P_i$ through expanding brackets.

The controller 10 of the cell phone 1 judges whether or not the value TC of the dot product calculated in step S106 is below a predetermined value C (step S107). When the controller 10 of the cell phone 1 judges that the value TC of the dot product is below the predetermined value C (S107: YES), the controller 10 of the cell phone 1 determines the interest positional information $P_i$ to be positional information including error, temporarily stores the interest positional information $P_i$ as invalid positional information in the storage section 11 (step S108), and judges whether or not the positional information $P_{i+1}$ subsequent to the interest positional information $P_i$ is the last one of the positional information temporarily stored in the storage section 11 on the basis of the fact (i=MAX(i)−1) whether or not the number "i" is a numerical value smaller by 1 than a maximum value (step S109).

When the controller 10 of the cell phone 1 judges that "i" is not a numerical value smaller by 1 than the maximum value (S109: NO), the processing is returned to step S102. The judgment processing and the determination processing are then continued with the subsequent positional information being set as next interest positional information.

Meanwhile, when the controller 10 of the cell phone 1 judges that "i" is smaller by 1 than the maximum value (S109: YES), the positional information stored in the storage section 11 as invalid positional information are eliminated from the detected positional information (step S110), and the processing is ended.

After the invalid positional information is eliminated, for example, processing of displaying a self-moving locus on a map image with using the display section 15 may be performed on the basis of the positional information stored in the storage section 11. Note that, for the display of the map image on the display section 15, the invalid positional information may be expressed on the map image with a different processing from the processing applied to other positional information, instead of being eliminated. For example, the positional information stored in the storage section as the invalid positional information may be expressed with semi-transparent point showing a corresponding position. Furthermore, in the case of being transmitted to a server apparatus (not shown), the detected positional information may be taken the elimination of the invalid positional information and then be transmitted to the base station BS in order to prevent the transmission of the invalid positional information.

Hereinafter, it will be described about a reason for determining that the positional information includes error when the controller 10 of the cell phone 1 calculates the index value (dot product) TC, and when the index value (dot product) TC is below the predetermined value C (S107: YES) in step S106 in the flowchart shown in FIG. 3.

Figure 4A:
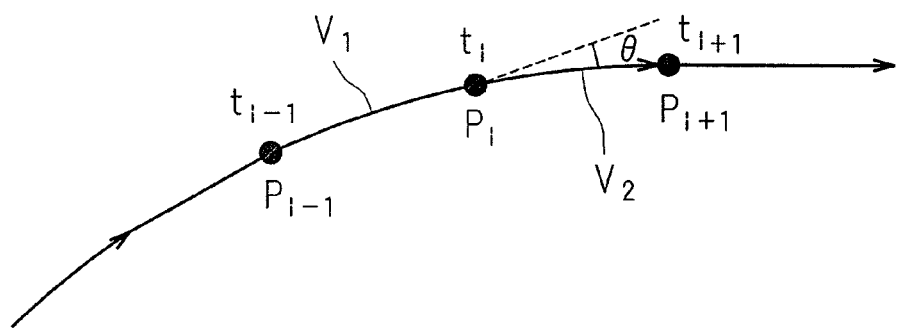
FIGS. 4A and 4B are explanatory views schematically showing a fluctuation of a shift trend expressed by values of dot product TC calculated by the controller of the cell phone according to the embodiment 1 of the present invention.
Figure 4B:
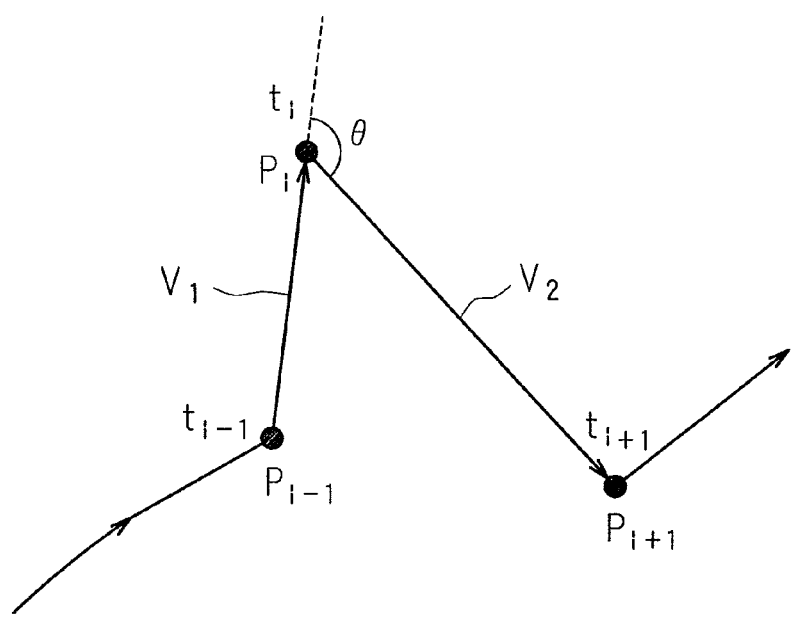

FIGS. 4A and 4B are explanatory views schematically showing the amplitude of fluctuation representing a direction of change expressed by the dot product TC calculated by the controller 10 of the cell phone 1 according to the embodiment 1 of the present invention. FIGS. 4A and 4B show the shift of the position of the movable body when time is elapsed from a time point $t_{i-1}$ to a time point $t_i$ and from the time point $t_i$ to a time point $t_{i+1}$. Specifically, FIGS. 4A and 4B show the direction of movement from the position shown by the positional information $P_{i-1}$ at the time point $t_{i-1}$ to the position shown by the positional information $P_i$ at the time point $t_i$ and the direction of movement from the position shown by the positional information $P_i$ at the time point $t_i$ to the position shown by the positional information $P_{i+1}$ at the time point $t_{i+1}$. The shift to the position shown by the positional information $P_i$ at the time point $t_i$ from the position shown by the positional information $P_{i-1}$ at the time point $t_{i-1}$ is expressed as vector $V_1=P_i-P_{i-1}$, and the shift to the position shown by the positional information $P_{i+1}$ at the time point $t_{i+1}$ from the position shown by the positional information $P_i$ at the time point $t_i$ is expressed as vector $V_2 = P_{i+1} - P_i$.

FIG. 4A shows a case that the direction of movement from the time point $t_{i-1}$ to the time point $t_i$ and the direction of movement of the movable body from the time point $t_i$ to the time point $t_{i+1}$ are substantially the same. Meanwhile, FIG. 4B shows a case that the direction of movement from the time point $t_{i-1}$ to the time point $t_i$ and the direction of movement from the time point $t_i$ to the time point $t_{i+1}$ are opposite to each other.

As shown in FIG. 4A, an angle $\theta$ formed by the vector $V_1$ and the vector $V_2$ is an acute angle when the directions of movement are approximately the same. Accordingly, the index value (dot product) TC corresponding to the amplitude of fluctuation representing a direction of change has a positive value. As the angle $\theta$ formed by the vector $V_1$ and vector $V_2$ becomes smaller and the directions of movements are made to be the same, the index value TC becomes a higher value. Meanwhile, as shown in FIG. 4B, the angle $\theta$ formed by the vectors $V_1$ and $V_2$ is an obtuse angle when the directions of movements are opposite to each other. Accordingly, the index value (dot product) TC corresponding to the amplitude of fluctuation representing a direction of change has a negative value. Further, as the angle $\theta$ formed by the vectors $V_1$ and $V_2$ goes opposite to be closer to 180°, the index value TC becomes a negative value, the absolute value becomes larger, and then the index value TC becomes lower.

In a case that the movable body moves in a constant direction, excluding the situation that the position shown by the positional information $P_i$ at the time point $t_i$ happens to be a point of return of the movement of the movable body, there is a high possibility that the positional information $P_i$ at the time point $t_i$ has a significant error when the TC is a negative value.

When the index value (dot product) TC is below the predetermined value C (S107: YES), the positional information is determined to include error. The reason is that, in the case that the movable body naturally moves in a constant direction as shown in FIGS. 4A and 4B, TC is considered to be a positive value, namely, the direction from the position shown by a previous positional information to the position shown by the interest positional information is considered to be almost the same as the direction from the position shown by the interest positional information to the position shown by the subsequent positional information, except for the situation that the movable body happens to be a point of return. Furthermore, the reason is that, in the case that positional information at the time points largely deviate from one another, each positional information is highly considered to have a large difference although the movable body naturally moves in a constant direction.

Further, it will be described with using equations about the reason for determining interest positional information to include error when the index value (dot product) TC is below the predetermined value C (S107: YES).

The positional information $P_i$ to be determined is two-dimensional numerical data such as longitude/latitude, with respect to one-dimensional variable such as time. It can be considered that an observed value $P(t)=(lo(t), la(t))$, which is a two-dimensional vector, is obtained with respect to an one-dimensional time vector "t". Note that "lo" indicates the longitude and "la" indicates the latitude.

In the embodiment 1, in order to determine the validity of an observed value $P(t_i)$, namely whether or not an error is included, an index expressing the amplitude of fluctuation representing a direction of change at the time vector $t_i$ is calculated as follows, with observed values $P(t_{i-1})$ and $P(t_{i+1})$ at each of the time point $t_{i-1}$ and time point $t_{i+1}$ while the vector $t_i$ is set as an intermediate point of the time point $t_{i-1}$ and time point $t_{i+1}$:

$$TC = (P(t_i) - P(t_{i-1})) \cdot (P(t_{i+1}) - P(t_i)) \quad (2).$$

TC is expressed as the dot product (scalar product) of a differential vector from the observed value $P(t_{i-1})$ at the time point $t_{i-1}$ to the observed value $P(t_i)$ at the time point $t_i$ and a differential vector from the observed value $P(t_i)$ at the time point $t_i$ to the observed value $P(t_{i+1})$ at the time point $t_{i+1}$.

When TC is expressed with each vector component, $$TC = (lo(t_i) - lo(t_{i-1})) \cdot (lo(t_{i+1}) - lo(t_i)) + (la(t_i) - la(t_{i-1})) \cdot (la(t_{i+1}) - la(t_i)) \quad (3)$$

is established.

TC expressed with each vector component is illustrated to be represented by expressions 2 and 3, and the judgment processing of the amplitude of fluctuation and the determination processing of error are illustrated to be applied to the positional information by the controller 10 of the cell phone 1, because two-dimensional observed values in one-dimensional time vectors are evaluated in the embodiment 1. However, it should be noted that the present invention is not limited to the configurations of applying the judgment processing and the determination processing to the positional information. The present invention can also be applied to the determination of an m-dimensional observed value with respect to an n-dimensional vector. For example, the present invention can be applied to the determination of a three-dimensional observed value, such as an electric field and a magnetic field at each position with respect to a three-dimensional spatial vector. Further, the present invention can be applied to the determination of a scalar brightness (grayscale) at each position with respect to a vector expressing a position on a two-dimensional plane. In such a case, TC can be expressed by the following expression 4.

(Equation 2)

$$TC = (\vec{v}(\vec{p}) - \vec{v}(\vec{a})) \cdot (\vec{v}(\vec{b}) - \vec{v}(\vec{p})) \quad (4)$$
$$= \sum_{i=1}^{m} (v_i(\vec{p}) - v_i(\vec{a})) \cdot (v_i(\vec{b}) - v_i(\vec{p}))$$

In expression 4, the vector v indicates an m-dimensional observed value, and the vectors p, a, and b indicate n-dimensional variable vectors. In addition, in expression 4, the vector p indicates the intermediate point between the vector a and the vector b, and therefore at least one component $p_i$, $a_i$, or $b_i$ of each vector p, a, and b is expressed so as to satisfy:

$$(p_i - a_i)(b_i - p_i) > 0, \text{ namely, } a_i > p_i > b_i \text{ or } a_i < p_i < b_i \quad (5).$$

Regarding components other than one component $p_i$, $a_i$, or $b_i$, the expression 5 need not necessarily be established. Accordingly, the vector $t_i$ in the expressions 2 and 3 is also applied to a condition expression 5 for the vector p so as to satisfy $(t_i - t_{i-1})(t_{i+1} - t_i) > 0$.

In addition, even when the m-dimensional observed value is an one-dimensional observed value that is scalar in the expression 4, this observed value is used as a one-dimensional vector satisfying m=1. In this case, multiplication of a shift amount is shown on the right side of the expression 4. When a multiplied value of the shift amount is lower (negative) than a predetermined value, the observed value can be determined to include error. For example, when a digital image in grayscale is analyzed to determine an observation amount of brightness (0 to 255) at a position on a two-dimensional plane, and when the brightness of adjacent three pixels is observed to be 128, 255, and 132 sequentially in a scanning direction, the shift amount 127 from 128 to 255 is multiplied by the shift amount −123 from 255 to 132. The negative value thus obtained by multiplication corresponds to the index value TC. With judging whether or not TC is below a predetermined value, it is possible to determine whether error is included.

The index value TC has the following characteristics, as the value TC is an index for the observed value v(p) expressed as vector p that is the intermediate point.

For example, in the case that true positional information for a one-dimensional time vector p is expressed as u(p) and the difference is expressed as δ(p), observed values v(a), v(p), v(b) are respectively expressed as:

$$v(a)=u(a)+\delta(a),$$

$$v(p)=u(p)+\delta(p),$$

$$v(b)=u(b)+\delta(b) \quad (6).$$

Differences are generated at random in a natural phenomenon or a social phenomenon, and an ensemble-average of differences including virtual fluctuation of differences is expressed as:

$$<\delta(a)>=0, <\delta(p)>=0, <\delta(b)>=0 \quad (7).$$

Note that <x> indicates the ensemble-average of "x". Thus, from the expressions 6 and 7, $$<\delta(a)>=<(v(a)-u(a))>,$$

$$<\delta(p)>=<(v(p)-u(p))>$$

$$<\delta(a)>=<(v(b)-u(b))>,$$

and $$<v(a)>=<u(a)>,$$

$$<v(p)>=<u(p)>,$$

$$<v(b)>=<u(b)> \quad (8)$$

are established.

Therefore, an expected value $<TC>_{a,b}$ of the index value TC corresponding to the amplitude of fluctuation representing a direction of change averaged with respect to "a" and "b" is expressed by an expression 9.

(Equation 3)

$$\langle TC \rangle_{a,b} = -\delta(p)^2 + \delta(p) \cdot (\langle u(a) \rangle_a + \langle u(b) \rangle_b - 2u(p)) + (\langle u(a) \rangle_a - u(p)) \cdot (u(p) - \langle u(b) \rangle_b) \quad (9)$$

As shown in the first term on the right side of the expression 9, the index value TC becomes a negative and lower value in the case that δ(p) becomes larger. Further, regarding p, an expected value $<TC>_{a,b,p}$ of the index value TC corresponding to the averaged amplitude of fluctuation representing a direction of change is expressed by an expression 10.

(Equation 4)

$$\langle TC \rangle_{a,b,p} = -\langle \delta(p)^2 \rangle_p + \langle (\langle u(a) \rangle_a - u(p)) \cdot (u(p) - \langle u(b) \rangle_b) \rangle_p \quad (10)$$

When the index value TC is statistically interpreted, the first term on the right side of the expression 10 shows a square average value of differences, and it can be considered that the second term on the right side has a characteristic of expressing consecutiveness of the shift trend. Even if the expressions 9 and 10 are taken into consideration, it can be said that there is a ground for judging that the index value TC includes a difference when it is lower than the predetermined value C, because the index value TC becomes a negative with a larger absolute value as the difference is larger. In other words, it can be appropriately estimated that an observed value largely deviating from the trend of observed values includes a significant large difference, even on the basis of the interpretation with equations.

Figure 6A:
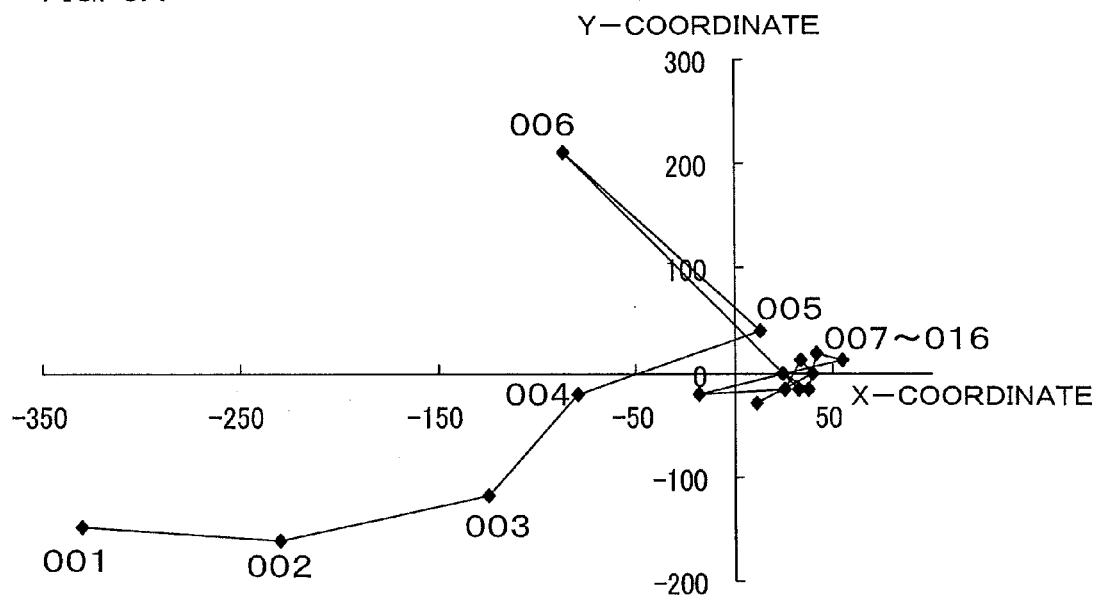
FIGS. 6A and 6B are explanatory views showing examples of positional information temporarily stored in a storage section of the cell phone according to the embodiment 1 of the present invention and a calculated index value TC.
Figure 6B:
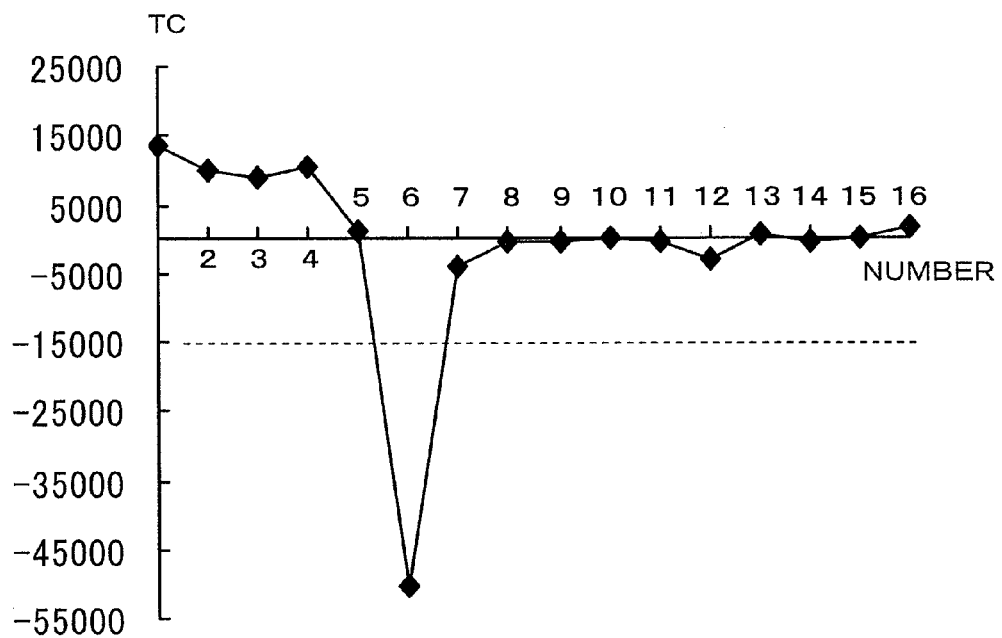

Next, it will be described about an example of determining positional information possibly including error, on the basis of the judgment with using specific data whether or not the index value TC is smaller than the predetermined value C. FIG. 5 and FIGS. 6A and 6B are explanatory views showing examples of the positional information temporarily stored in the storage section 11 of the cell phone 1 according to the embodiment 1 of the present invention and the calculated index value TC. FIG. 5 shows: the number attached to each positional information; time (seconds) from starting detection of longitude/latitude by the GPS receiver 13; detected longitude/latitude (0.01 seconds); XY coordinates (m) converted to meters with a predetermined longitude/latitude being set as an origin; and the index value TC for the positional information of each number calculated on the XY coordinate. The values of the XY coordinate are rough numbers obtained by deleting the decimal place. FIG. 6A is a dispersion view plotting the XY coordinate of each positional information shown in FIG. 5, and FIG. 6B is a graph showing the value of TC of each positional information per number.

As shown in FIG. 6A, the cell phone 1, which is the movable body, moves naturally from the west to the east, namely, from the position shown by positional information "001" to the position shown by positional information "005". However, the position shown by positional information "006" deviates from the previous moving direction by 90° or more and deviates to the position shown by positional information "007". Then, these deviations likely cancel the large deviation to the position shown by the positional information "006" from the position shown by the positional information "005". On the basis of the dispersion view shown in FIG. 6A, the positional information "006" can be estimated to be a positional information including a large difference. Meanwhile, the index value TC of the positional information "006" indicates a remarkably low value of about −50000. Therefore, it is possible to determine that the positional information "006" estimated to a include a large difference is error information, with setting the predetermined value C of the index value TC to be −15000 shown by a broken line, calculating the index value TC with using the controller 10 of the cell phone 1, and with comparing it with the predetermined value C.

Regarding each positional information of the cell phone 1 referred to as the movable body, it is calculated in the processing of the controller 10 of the cell phone 1 about the index value TC for the interest positional information $P_i$ showing the intermediate point between the position shown by the previous positional information $P_{i-1}$ and the position shown by the subsequent positional information $P_{i+1}$, and is determined whether or not the interest positional information $P_i$ is error in accordance with whether or not the index value TC is below the predetermined value C.

In the embodiment 1, the positional information are illustrated to be eliminated when being determined as error and stored in the storage section as invalid information in step S110 in the flowchart shown in FIG. 3. However, the present invention is not limited thereto, and the error can be corrected or complemented by using other positional information. For example, the error may be corrected by replacing it with a median value or a mean value of anteroposterior five positional information. Further, the position and the locus corresponding to the positional information stored in the storage section as the invalid positional information may be displayed in a different way from the way for other moving loci, when the moving locus of the cell phone 1 is displayed on the basis of the detected positional information.

Embodiment 2

In the embodiment 1, the controller 10 of the cell phone 1 calculates the dot product referred to as the index value TC of the vector from the position shown by previous positional information to the position shown by interest positional information and the vector from the position shown by the interest positional information to the position shown by subsequent positional information, and then the amplitude of fluctuation representing a direction of change of the anteroposterior positional information is judged depending on whether or not the index value TC is below a predetermined value. Meanwhile, in the embodiment 2, a controller 10 of a cell phone 1 calculates an index value TRC in consideration of the time required for movement from the position shown by previous positional information to the position shown by interest positional information and the time required for movement from the position shown by the interest positional information to the position shown by subsequent positional information.

The structure of the cell phone 1 according to the embodiment 2 is the same as the structure of the cell phone 1 according to the embodiment 1, and therefore detailed description of the internal structure is not given. In the embodiment 2, calculation processing of the index value TRC by the controller 10 of the cell phone 1 is different from that of the embodiment 1, and therefore hereinafter, it will describe about the judgment processing and the determination processing including the calculation processing of the index value TRC by the controller 10, with using the same signs and numerals as those of the embodiment 1.

The controller 10 of the cell phone 1 according to the embodiment 2 temporarily stores in a storage section 11 the positional information detected and transmitted by a GPS transmitter 13 every time of elapsing predetermined period. The controller 10 of the cell phone 1 applies a number "i" to the positional information in accordance with time-sequential order to store the positional information in association with the numbers "i", in order to later read out the positional information stored in the storage section 11 in an ascending order of the time being a one-dimensional variable. Further, time information received from GPS satellites S1, S2, ... is also transmitted through the GPS receiver 13, and therefore the controller 10 of the cell phone 1 stores the time information in association with the positional information. The controller 10 of the cell phone 1 reads out i-th positional information, the anteroposterior positional information to the i-th positional information and the time information associated with the positional information from the storage section 11, and applies judgment processing and determination processing to the i-th positional information.

Figure 7:
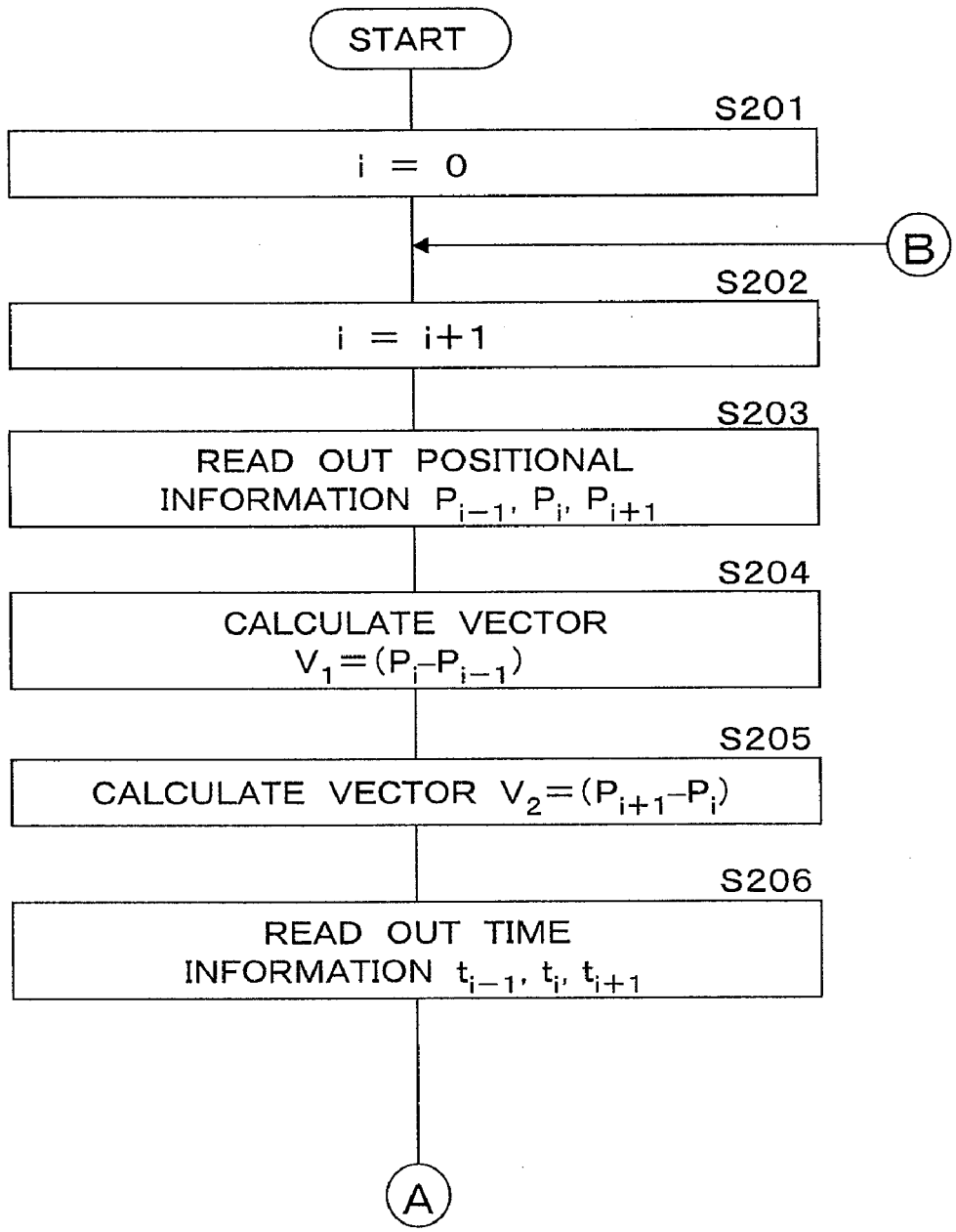
FIG. 7 is a flowchart showing a procedure of judgment processing and determination processing performed by a controller of a cell phone according to an embodiment 2 of the present invention.
Figure 8:
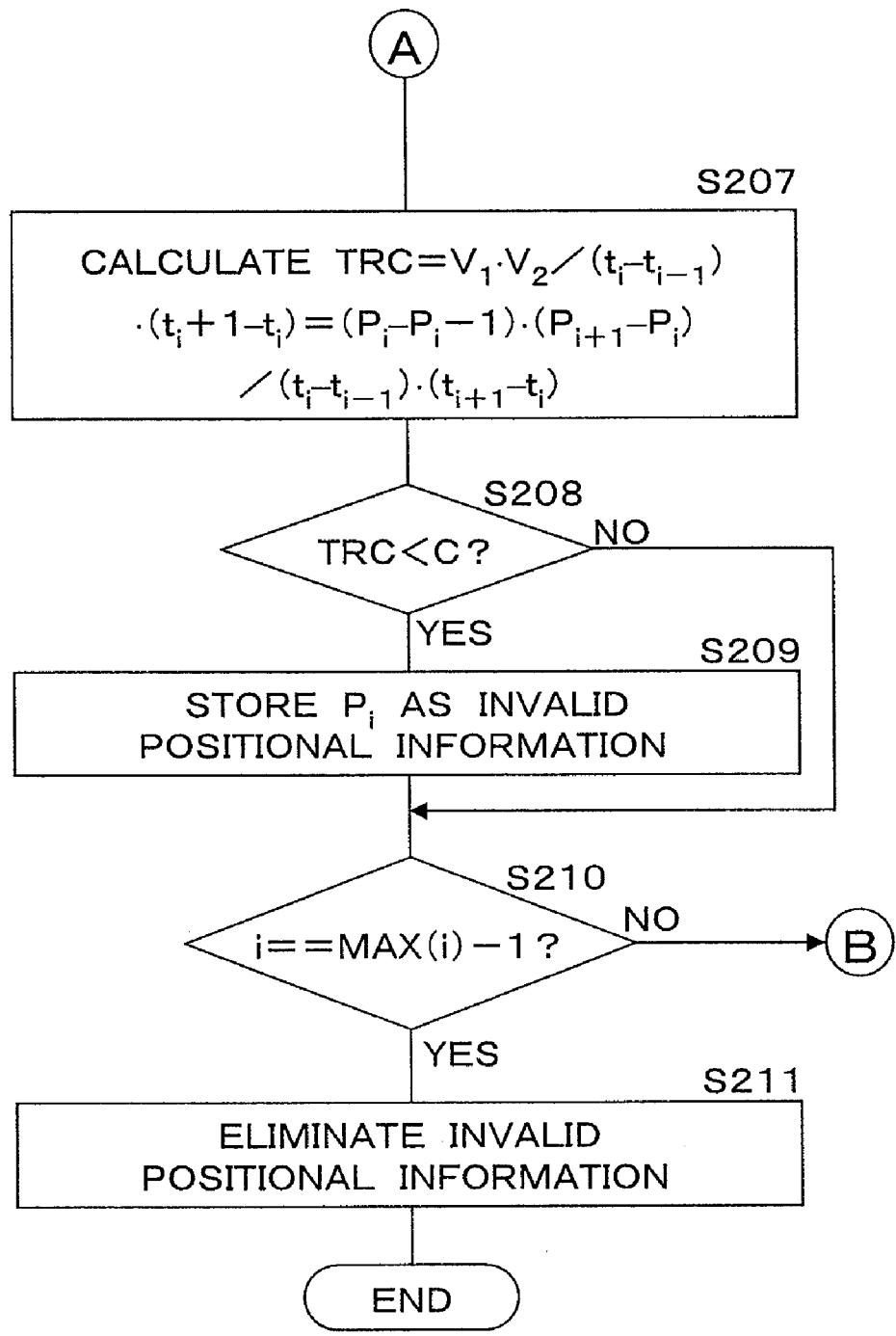
FIG. 8 is a flowchart showing the procedure of the judgment processing and the determination processing performed by the controller of the cell phone according to the embodiment 2 of the present invention.

FIGS. 7 and 8 are flowcharts showing a procedure of the judgment processing and the determination processing performed by the controller 10 of the cell phone 1 according to the embodiment 2 of the present invention. Note that steps S201 to S205 in the flowcharts shown in FIGS. 7 and 8 are similar to the steps S101 to S105 of the flowchart shown in FIG. 3 in the embodiment 1. Therefore, detailed description is not given.

The controller 10 of the cell phone 1 according to the embodiment 2 calculates vectors $V_1$ and $V_2$ in steps S204 and S205, and thereafter reads out time information $t_{i-1}$, $t_i$, and $t_{i+1}$ in association with $P_{i-1}$, $P_i$, and $P_{i+1}$ from the storage section 11 (step S206).

The controller 10 of the cell phone 1 utilizes the vectors $V_1$ and $V_2$ calculated in steps S204 and S205 and $t_{i-}$, $t_i$, and $t_{i+1}$ being read out in step S206, divides the dot product TC [$TC=V_1 \cdot V_2=(P_i-P_{i-1}) \cdot (P_{i+1}-P_i)$] by time ($t_i-t_{i-1}$) required for movement from $P_{i-1}$ to $P_i$, and further divides it by time ($t_{i+1}-t_i$) required for movement from $P_i$ to $P_{i+1}$, to calculate the index value TRC (step S207).

Next, the controller 10 of the cell phone 1 judges whether or not the index value TRC calculated in step S207 is below a predetermined value C (step S208). When the controller 10 of the cell phone 1 judges that the index value TRC is below the predetermined value C (S208: YES), the interest positional information $P_i$ is determined to include error, and temporarily stored in the storage section 11 as invalid positional information (step S209). Then, it is judged whether or not positional information $P_{i+1}$ subsequent to the interest positional information $P_i$ is the last one of the positional information temporarily stored in the storage section 11 on the basis of the fact (i=MAX(i)−1) whether or not the number "i" is a numerical value smaller by 1 than a maximum value (step S210).

When the controller 10 of the cell phone 1 judges that "i" is not a numerical value smaller by 1 than the maximum value (S210: NO), the processing is returned to step S202. The judgment processing and the determination processing are then continued to with the subsequent positional information being set as next interest positional information.

Meanwhile, when the controller 10 of the cell phone 1 judges that "i" is smaller by 1 than the maximum value (S210: YES), the positional information stored in the storage section 11 as invalid positional information are eliminated from the detected positional information stored in the storage section 11 (step S211), and the processing is ended. The processing applied to the invalid positional information is similar to the processing of the embodiment 1.

Hereinafter, it will be described about a reason for determining in the embodiment 2 that the positional information includes error when the index value TRC calculated in step S207 of the flowchart shown in FIGS. 7 and 8 is below the predetermined value C (S208: YES).

The GPS receiver 13 of the cell phone 1 is configured to detect positional information every time a constant predetermined period is elapsed. However, the detection of the positional information by the GPS receiver 13 may not be performed every time the constant predetermined period is elapsed. Depending on the function of the cell phone 1, for example, processing of discarding the positional information detected by the controller 10 of the cell phone 1 is performed on the basis of the radio wave intensity shown by the information, while radio wave intensity information from the GPS satellites S1, S2, ... is transmitted from the base station BS. The reason is that detection accuracy of positional information by the GPS receiver 13 is sometimes extremely low in a case of extremely weak radio waves due to weather or the like.

In such a case, the timing for detecting positional information is not constant. Thus, even when the movable body is truly moved during a long time and the position greatly deviates, the dot product TC becomes a low value due to such a great deviation of the position, and then the positional information may be determined to include error.

In order to avoid such a determination, the controller 10 of the cell phone 1 according to the embodiment 2 normalizes the dot product TC of the vector showing the movement calculated by the expression 2 of the embodiment 1 with using the time required for each movement, and calculates the index value TRC as shown in the following expression 11.

(Equation 5)

$$TRC = \frac{(\vec{P}_i - \vec{P}_{i-1}) \cdot (\vec{P}_{i+1} - \vec{P}_i)}{|t_i - t_{i-1}| \cdot |t_{i+1} - t_i|} \quad (11)$$

$$= \frac{(lo(t_i) - lo(t_{i-1})) \cdot (lo(t_{i+1}) - lo(t_i)) +}{|t_i - t_{i-1}| \cdot |t_{i+1} - t_i|}$$

Note that TRC can be expressed by the expression 5 because it is evaluated about the positional information expressed by a two-dimensional observed value for a one-dimensional time vector even in the embodiment 2. However, it is possible to apply for determination of an m-dimensional observed value shown by an n-dimensional vector. Therefore, TRC can be expressed as shown in the following expression 12.

(Equation 6)

$$TRC = \frac{(\vec{v}(\vec{p}) - \vec{v}(\vec{a})) \cdot (\vec{v}(\vec{b}) - \vec{v}(\vec{p}))}{\|\vec{p} - \vec{a}\| \cdot \|\vec{b} - \vec{p}\|} \quad (12)$$

$$\left(\|\vec{p} - \vec{a}\|_q = \left\{\sum_{i=1}^{n} (p_i - a_i)^q\right\}^{\frac{1}{q}}\right)$$

Thus, it is possible to perform determination in consideration of the time required for movement, and positional information is determined to be error when the position is shown to be moved greatly in a short time. Further, positional information is determined not to be error when the position is shown to be moved greatly with taking a long time.

Embodiment 3

In the embodiment 2, the index value TRC is calculated by the controller 10 of the cell phone 1 regarding interest positional information, in consideration of the time required for the movement from the position shown by previous positional information to the position shown by the interest positional information and the time required for the movement from the position shown by the interest positional information to the position shown by subsequent positional information. Meanwhile, in the embodiment 3, a controller 10 of a cell phone 1 does not calculate the index value TRC only for a relation between one set of previous positional information and subsequent positional information. Instead, the controller 10 extracts plural sets of previous positional information and subsequent positional information, and calculates a mean value of TRCs, i.e., <TRC>, through calculating each TRC for a relation between each of the plural sets of previous positional information and subsequent positional information.

The structure of the cell phone 1 of the embodiment 3 is similar to the structures of the cell phones 1 of the embodiments 1 and 2, and therefore detailed description of the internal structure is not given. In the embodiment 3, calculation processing of the index value <TRC> by the controller 10 of the cell phone 1 is different from those of the embodiments 1 and 2, and therefore it will be described about judgment processing and determination processing including the calculation processing of the index value <TRC> performed by the controller 10 in the embodiment 3 with using the same signs and numeral.

Figure 9:
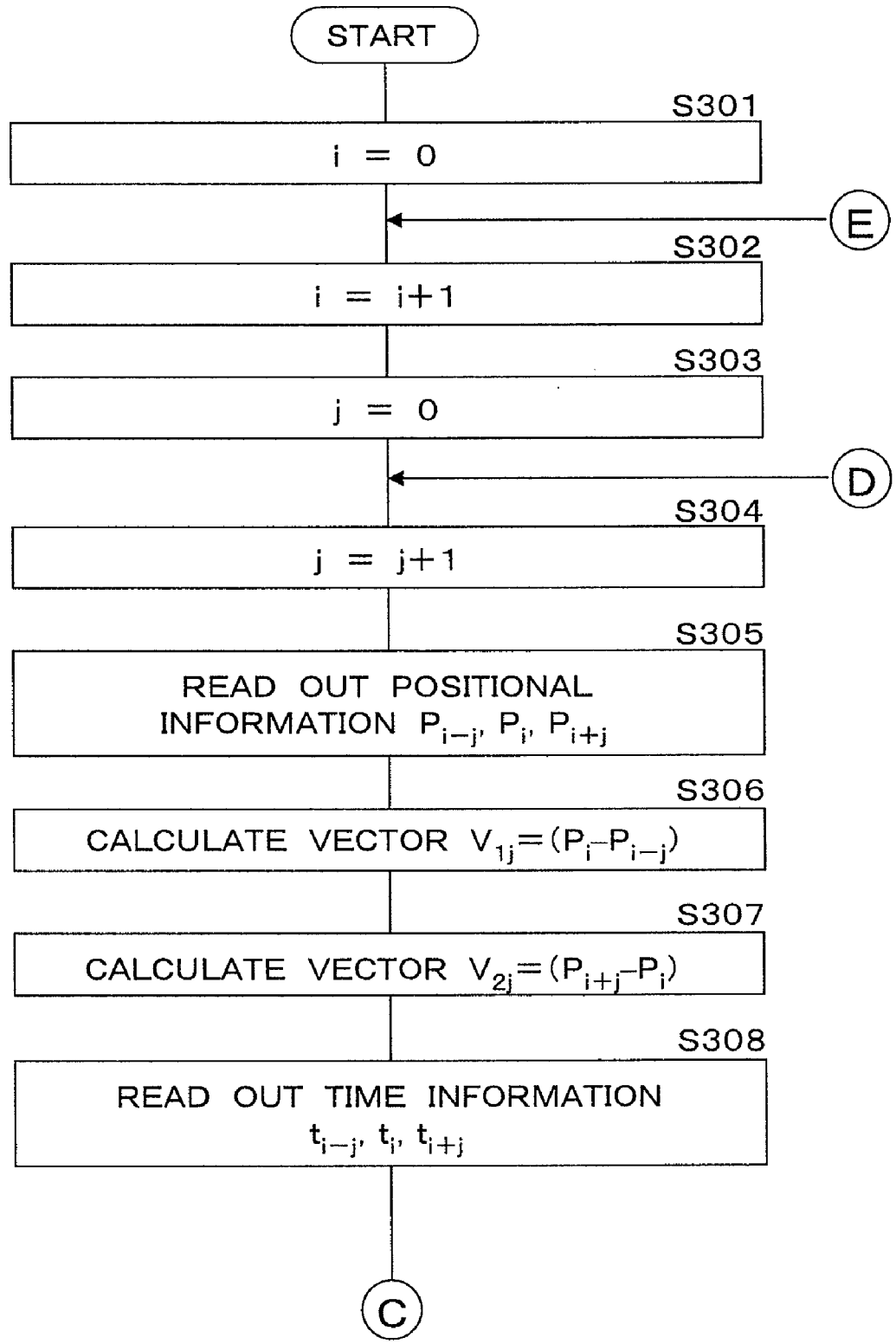
FIG. 9 is a flowchart showing a procedure of judgment processing and determination processing performed by a controller of a cell phone according to an embodiment 3 of the present invention.
Figure 10:
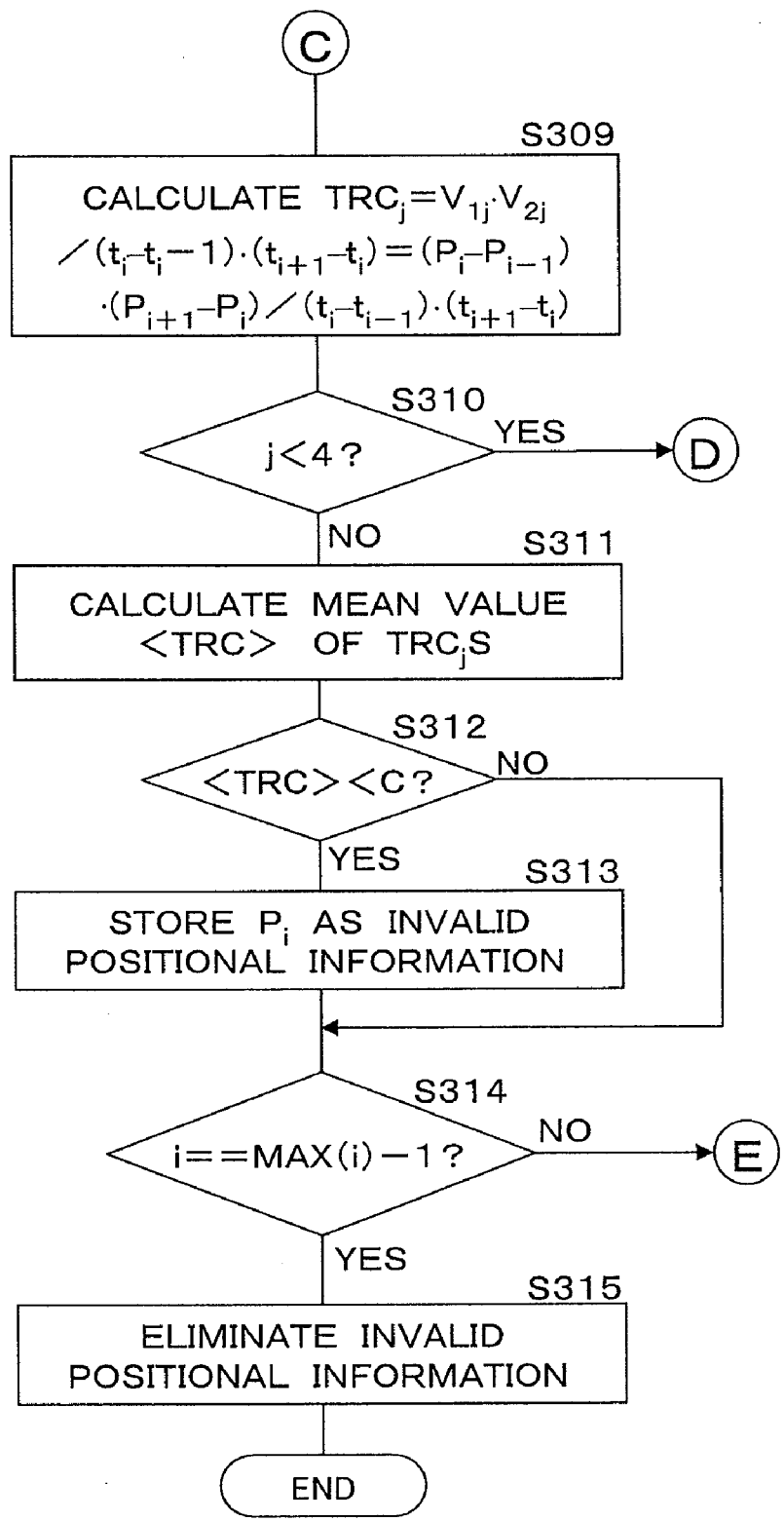
FIG. 10 is a flowchart showing the procedure of the judgment processing and the determination processing performed by the controller of the cell phone according to the embodiment 3 of the present invention.

FIGS. 9 and 10 are flowcharts showing the procedures of the judgment processing and the determination processing performed by the controller 10 of the cell phone 1 according to the embodiment 3 of the present invention.

The controller 10 of the cell phone 1 assigns 0 to the number "i" (step S301), and adds 1 to the number "i" (step S302), in order to read out positional information in time sequential order. Further, the controller 10 of the cell phone 1 assigns 0 to the number "j" for reading plural previous and subsequent positional information of the positional information $P_i$ (step S303), and adds 1 to the number "j" (step S304).

The controller 10 of the cell phone 1 reads out positional information $P_{i-j}$, $P_i$, and $P_{i+j}$ with using the number "j" (step S305). Note that the positional information $P_i$ shows a vector having variables according to longitude and latitude.

Next, regarding the interest positional information $P_i$ that is a determination object, the controller 10 of the cell phone 1 calculates vector $V_{1j}=(P_i-P_{i-j})$ showing the shift, namely, the movement from the previous positional information $P_{i-j}$ to the interest positional information $P_i$, (step S306). Further, the controller 10 calculates vector $V_{2j}=(P_{i+j}-P_i)$ showing the shift, namely, the movement from the interest positional information $P_i$ to the subsequent positional information $P_{i+j}$ (step S307).

The controller 10 of the cell phone 1 reads out from a storage section 11 the time information $t_{i-j}$, $t_i$, and $t_{i+j}$ associated with $P_{i-j}$, $P_i$, and $P_{i+j}$ (step S308) and calculates $TRC_j=V_{1j}\cdot V_{2j}/(t_i-t_{i-j})\cdot(t_{i+j}-t_i)=(P_i-P_{i-j})\cdot(P_{i+j}-P_i)/(t_i-t_{i-j})\cdot(t_{i+j}-t_i)$ for the number "j" with using the vectors $V_{1j}$ and $V_{2j}$ calculated in steps S306 and S307 and the time information $t_{i-j}$, $t_i$, and $t_{i+j}$ being read in step S308 (step S309).

The controller 10 of the cell phone 1 judges whether or not "j" is below 4, in order to calculate three of $TRC_j$ (step S310). When "j" is judged to be below 4 (S310: YES), the processing is returned to step S304, and the processing of calculating $TRC_j$ is continued regarding "j"=2, 3.

When the controller 10 of the cell phone 1 judges that "j" is 4 or more (S310: NO), the controller 10 calculates a mean value of $TRC_j$s, i.e., <TRC>, in a case of "j"=1, 2, 3 (step S311).

Next, the controller 10 of the cell phone 1 judges whether or not the mean value of $TRC_j$s, i.e., <TRC>, calculated in step S311 is below a predetermined value C (step S312). When the controller 10 of the cell phone 1 judges that <TRC> is below the predetermined value C (S312: YES), the interest positional information $P_i$ is determined to be positional information including error and is temporarily stored in the storage section 11 as invalid information (step S313). And then it is judged whether or not the positional information $P_{i+1}$ subsequent to the interest positional information $P_i$ is the last one of the positional information temporarily stored in the storage section 11, in accordance with the fact (i=MAX(i)-1) whether or not the number "i" is a numerical value smaller by 1 than a maximum value (step S314).

When the controller 10 of the cell phone 1 judges that "i" is not a numerical value smaller by 1 than the maximum value (S314: NO), the processing is returned to step S302. The judgment processing and the determination processing are then continued with the subsequent positional information being set as next interest positional information.

Meanwhile, when the controller 10 of the cell phone 1 judges that "i" is a numerical value smaller than by 1 the maximum value (S314: YES), the positional information that are stored in the storage section 11 as invalid information are eliminated from the detected positional information (step S315), and the processing is ended. The processing for the invalid positional information is similar to the processing in the embodiments 1 and 2.

As shown in the flowcharts of FIGS. 9 and 10, the controller 10 of the cell phone 1 in the embodiment 3 calculates a mean value through calculating not only the index value TRC of the anteroposterior positional information $P_{i-1}$ and $P_{i+1}$ that are positional information time-sequentially immediately before and immediately after the interest positional information $P_i$ but also another index value TRCs of positional information at the neighboring time points, to thereby accurately determine only one positional information. Therefore, it is possible to accurately determine that one positional information greatly deviating in a short time from the plural neighboring positional information is error information.

In addition, even regarding the calculation of a mean value of TRCs in the embodiment 3, it is possible to apply for determination of an m-dimensional observed value shown by an n-dimensional vector. For example, it is possible to apply for determination of a three-dimensional observed value, such as an electric field and a magnetic field at each position, shown by a three-dimensional spatial vector. Therefore, the mean value of the TRCs can be expressed as shown in the following expression 13.

(Equation 7)

$$\langle TRC \rangle_{a,b} = \frac{1}{N_{\{a,b\}}} \sum_{\{a,b\}} \frac{(\vec{v}(\vec{p}) - \vec{v}(\vec{a})) \cdot (\vec{v}(\vec{b}) - \vec{v}(\vec{p}))}{\|\vec{p} - \vec{a}\| \cdot \|\vec{b} - \vec{p}\|} \quad (13)$$

Note that $N_{\{a,b\}}$ on the right side of the expression 13 shows a combination of "a" and "b".

In the flowcharts shown in FIGS. 9 and 10 in the embodiment 3, a combination of previous positional information and subsequent positional information of interest positional information is read out time-sequentially and symmetrically in an anteroposterior manner. And then, a mean value of the TRCs is calculated regarding the combination of the read previous positional information and the subsequent positional information. However, the calculation of the mean value in the embodiment 3 is not limited thereto, and the neighboring positional information of the interest positional information may be freely combined to calculate a mean value without reading it time-sequentially and symmetrically in an anteroposterior manner. Further, it is obvious that the number of combinations is not limited to 3, although the number of combinations is set to be 3 ("j"=1, 2, 3) for illustration purpose in the embodiment 3.

Embodiment 4

In an embodiment 4, plural combinations of previous positional information and subsequent positional information of interest positional information are extracted, and an index value (dot product) TC of each extracted combination is calculated. And then, a correlation coefficient is calculated with respect to the correlations between TC and the time required for moving from the position shown by the previous positional information to the position shown by the interest positional information and between TC and the time required for moving from the position shown by the interest positional information to the position shown by the subsequent positional information.

The structure of a cell phone 1 in the embodiment 4 is similar to the structures of the cell phones 1 in the embodiments 1 to 3, and therefore detailed description of the internal structure is not given. The embodiment 4 includes the calculation processing of the correlation coefficient by the controller 10 of the cell phone 1, which is different from the embodiments 1 to 3. Therefore, hereinafter, it will be described about judgment processing and determination processing including the calculation processing of the correlation of coefficient by the controller 10, with using the same signs and numerals.

Figure 11:
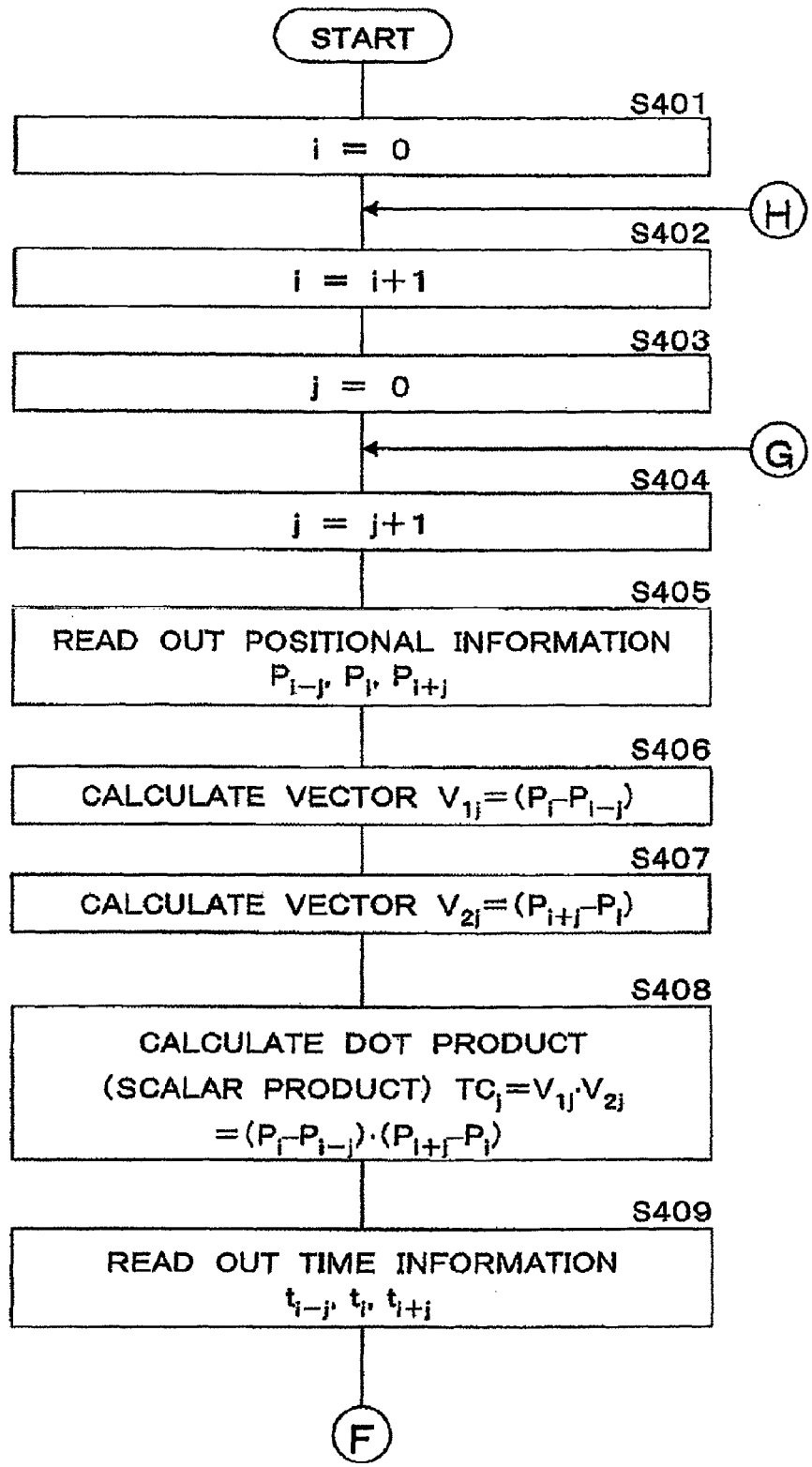
FIG. 11 is a flowchart showing a procedure of judgment processing and determination processing performed by a controller of a cell phone according to an embodiment 4 of the present invention.
Figure 12:
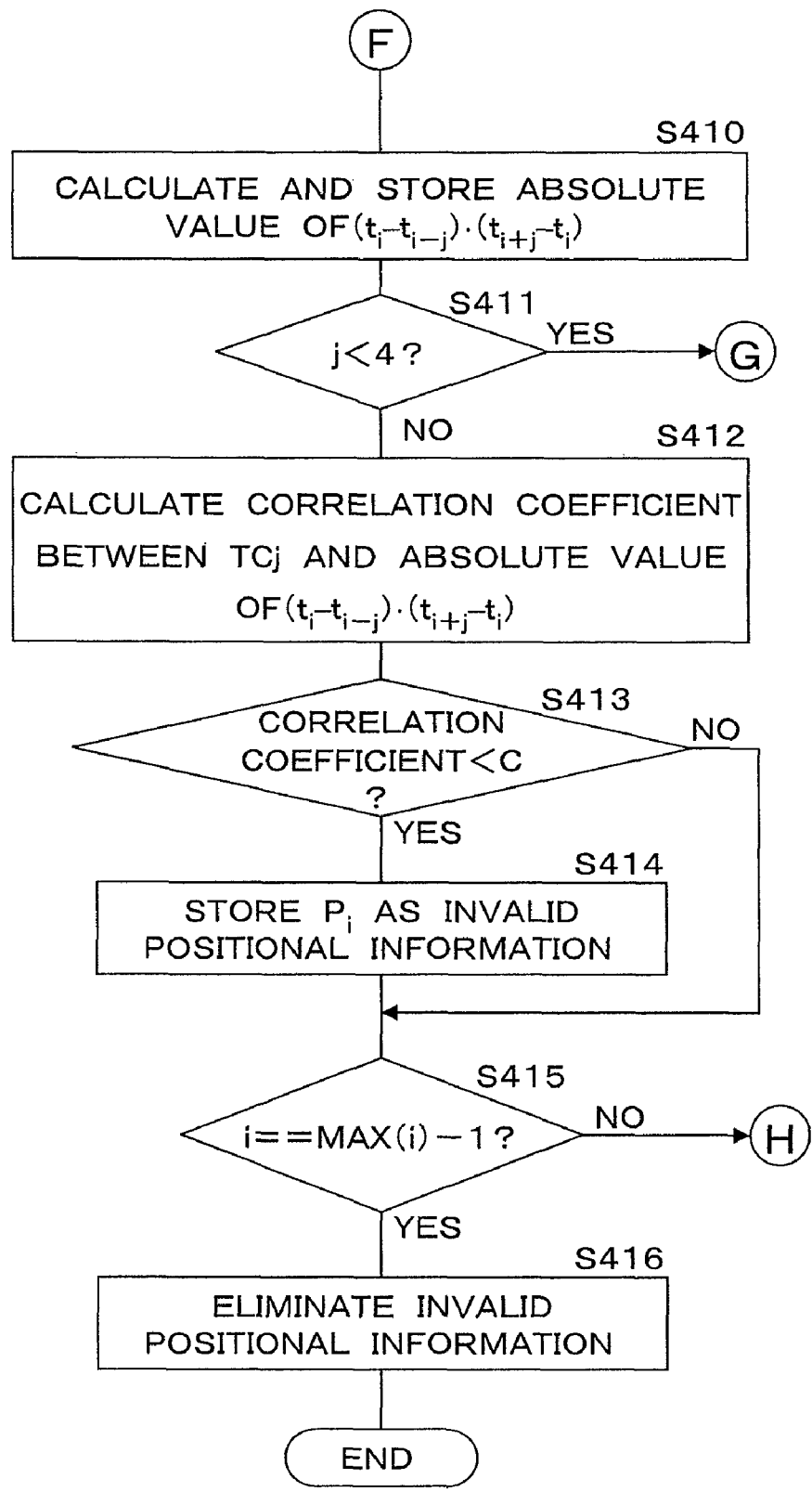
FIG. 12 is a flowchart showing the procedure of the judgment processing and the determination processing performed by the controller of the cell phone according to the embodiment 4 of the present invention.

FIGS. 11 and 12 are flowcharts showing procedures of the judgment processing and the determination processing performed by the controller 10 of the cell phone 1 according to the embodiment 4 of the present invention. Note that steps S401 to step S407 in the flowcharts shown in FIGS. 11 and 12 show similar processing to the processing of steps S301 to step S307 in the flowcharts shown in FIGS. 9 and 10 of the embodiment 3, and therefore detailed description is not given.

The controller 10 of the cell phone 1 according to the embodiment 4 calculates vectors $V_{1j}$ and $V_{2j}$ in steps S406 and S407, then calculates a dot product $TC_j$ of the vectors $V_{1j}$ and $V_{2j}$ [$TC_j = V_{1j} \cdot V_{2j} = (P_i - P_{i-j}) \cdot (P_{i+j} - P_i)$], and temporarily stores it in a storage section 11 (step S408).

Next, the controller 10 of the cell phone 1 reads out from the storage section 11 time information $t_{i-j}$, $t_i$, and $t_{i+j}$ associated with $P_{i-j}$, $P_i$, and $P_{i+j}$, respectively (step S409). Then, the controller 10 calculates the absolute value of $(t_i - t_{i-j}) \cdot (t_{i+j} - t_i)$, and temporarily stores it in the storage section 11 (step S410).

The controller 10 of the cell phone 1 judges whether or not "j" is below 4, in order to calculate three sets of the $TC_j$ and the absolute value of $(t_i - t_{i-j}) \cdot (t_{i+j} - t_i)$ (step S411). When "j" is judged to be below 4 (S411: YES), the processing is returned to step S404, and the processing of calculating $TC_j$ is continued regarding "j"=2, 3.

When the controller 10 of the cell phone 1 judges that "j" is 4 or more (S411: NO), the controller 10 calculates a correlation coefficient showing the correlation between $TC_j$s calculated and the absolute values of $(t_i - t_{i-j}) \cdot (t_{i+j} - t_i)$, in a case of "j"=1, 2, 3 (step S412).

Next, the controller 10 of the cell phone 1 judges whether or not the correlation coefficient showing the correlation between $TC_j$s and the absolute values of $(t_i - t_{i-j}) \cdot (t_{i+j} - t_i)$ being calculated in step S412 is below a predetermined value C (step S413). When the controller 10 of the cell phone 1 judges that the correlation coefficient is below the predetermined value C (S413: YES), the controller 10 determines that the interest positional information $P_i$ is a positional information including an error and temporarily stores it in the storage section 11 as invalid information (step S414). And then, it is judged whether or not the positional information $P_{i+1}$ subsequent to the interest positional information $P_i$ is the last one of the positional information temporarily stored in the storage section 11, in accordance with the fact (i=MAX(i)-1) whether or not the number "i" is a numerical value smaller by 1 than a maximum value (step S415).

When the controller 10 of the cell phone 1 does not judge that "i" is a numerical value smaller by 1 than the maximum value (S415: NO), the processing is returned to step S402. The judgment processing and the determination processing are then continued with the subsequent positional information being set as next interest positional information.

Meanwhile, when the controller 10 of the cell phone 1 judges that "i" is a numerical value smaller by 1 than the maximum value (S415: YES), the controller 10 eliminates, from the detected positional information, the positional information stored in the storage section 11 as invalid positional information (step S416), and the processing is ended. The processing applied to the invalid positional information is similar to the processing of any one of the embodiments 1 to 3.

As shown in the flowcharts of FIGS. 11 and 12, the controller 10 of the cell phone 1 in the embodiment 4 calculates the index value TC for not only the positional information $P_{i-1}$ and $P_{i+1}$ that are positional information time-sequentially immediately before and immediately after the interest positional information $P_i$ but also positional information at a neighboring time point, and calculates a correlation coefficient showing the correlation between the calculated TCs and the time required for each movement. Therefore, it is possible to determine that positional information having a correlative relation which shows large amplitude of fluctuation representing a direction of change in a short time required for the shift with respect to the neighboring positional information is error information.

In addition, even regarding the calculation of the correlation coefficient in the embodiment 4, it is possible to apply for determination of an m-dimensional observed value shown by an n-dimensional vector. For example, it is possible to apply for determination of a three-dimensional observed value, such as an electric field and a magnetic field at each position, shown by a three-dimensional spatial vector. Therefore, the correlation coefficient between the index value TC corresponding to the amplitude of fluctuation and the absolute value of the time required for the shift can be expressed as shown in the following expression 14.

(Equation 8)

$$Cor(TC, \|p-a\| \cdot \|b-p\|) \qquad (14)$$

Note that, on the right side of the expression 14, Cor(x, y) is calculated by the following expression 15.

(Equation 9)

$$Cor(x, y) = \frac{\sum_{i=1}^{k}(x_i - \overline{x})(y_i - \overline{y})}{\sqrt{\sum_{i=1}^{k}(x_i - \overline{x})^2}\sqrt{\sum_{i=1}^{k}(y_i - \overline{y})^2}} \qquad (15)$$

$$\left(\overline{x} = \frac{1}{k}\sum_{i=1}^{k}x_i, \overline{y} = \frac{1}{k}\sum_{i=1}^{k}y_i\right)$$

In the flowcharts shown in FIGS. 11 and 12 of the embodiment 4, in the same way as the embodiment 3, the controller 10 reads out a combination of previous positional information and subsequent positional information of interest positional information time-sequentially and symmetrically in an anteroposterior manner, and calculates TC of the combination of the read previous positional information and the subsequent positional information. And then the controller 10 calculates the correlation coefficient showing the correlation between TC and the absolute value of the multiplication of the time required for each shift. However, the calculation of the correlation coefficient in the embodiment 4 is not limited thereto, and neighboring positional information around interest positional information may be freely combined to calculate the correlation coefficient without reading time-sequentially and symmetrically in an anteroposterior manner. Further, it is obvious that the number of combinations is not limited to 3, although the number of combinations is set to be 3 ("j"=1, 2, 3) for illustration purpose in the embodiment 4.

Embodiment 5

In an embodiment 5, a controller 10 of a cell phone 1 extracts time-sequential positional information, calculates an index value TRC for each extracted positional information being set as interest positional information, and then calculates for the entire extracted positional information a probability that the TRC is below a predetermined value C. When the calculated probability is a predetermined value Pc or more, the controller 10 of the cell phone 1 determines the entire extracted positional information to be an area containing much positional information including error.

The structure of the cell phone 1 according to the embodiment 5 is similar to the structure of the cell phones 1 according to embodiments 1 to 4, and therefore detailed description of the internal structure is not given. In the embodiment 5, judgment processing of the amplitude of fluctuation representing a direction of change and determination processing of error performed by the controller 10 of the cell phone 1 is different from those of the embodiments 1 to 4, and therefore it will be described hereinafter about the judgment processing and the determination processing performed by the controller 10, with using the same signs and numerals.

Figure 13:
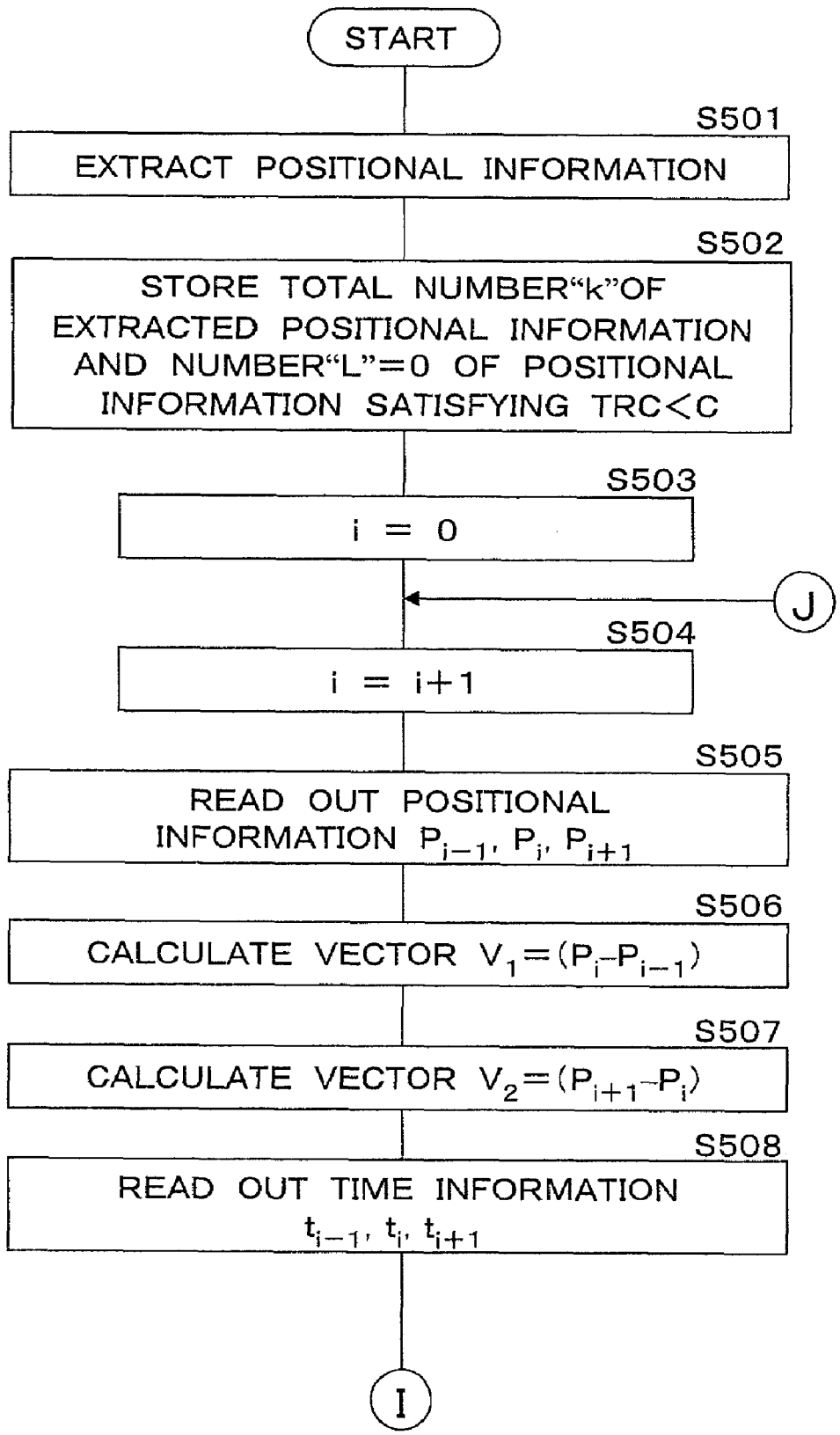
FIG. 13 is a flowchart showing a procedure of judgment processing and determination processing performed by a controller of a cell phone according to an embodiment 5 of the present invention.
Figure 14:
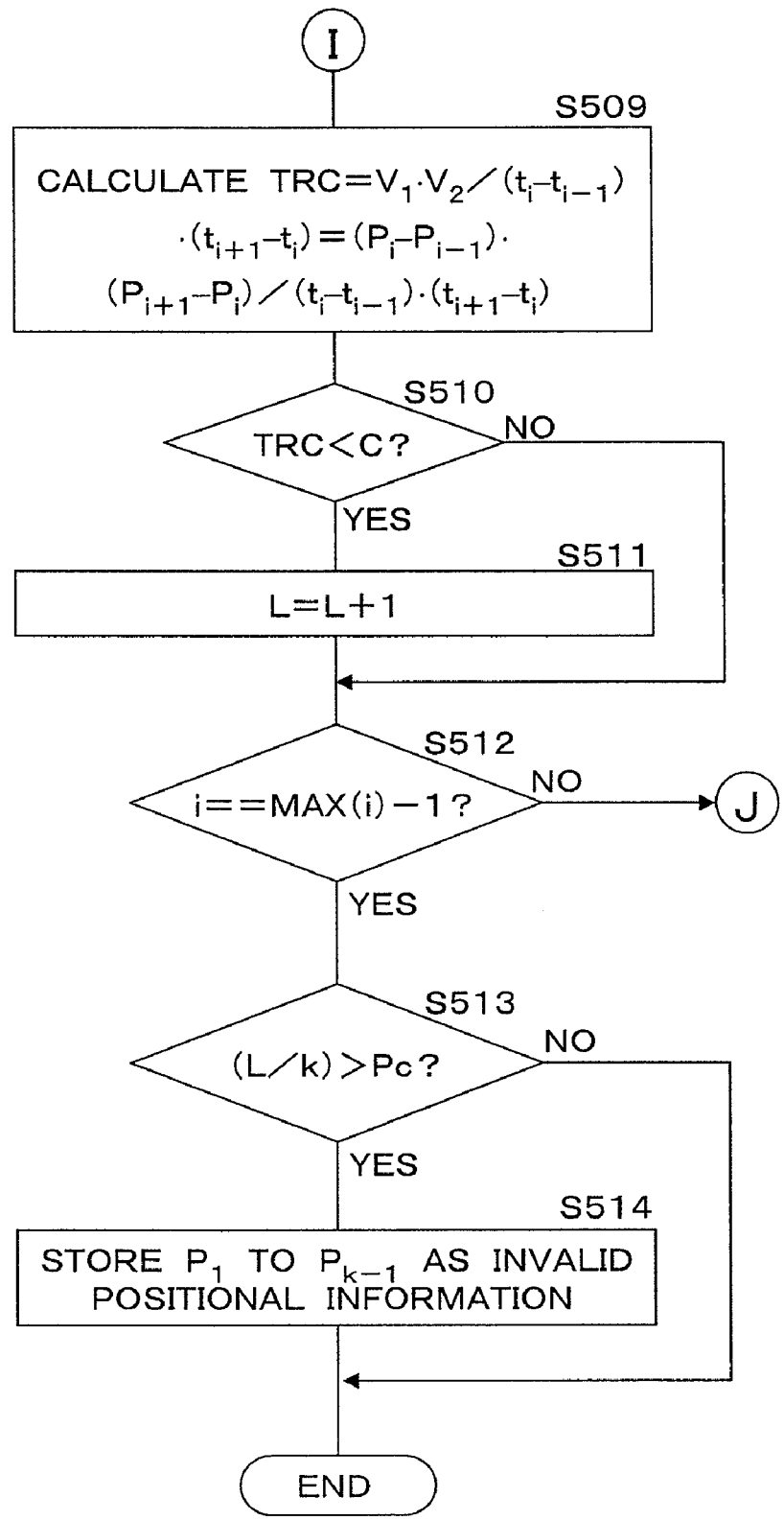
FIG. 14 is a flowchart showing the procedure of the judgment processing and the determination processing performed by the controller of the cell phone according to the embodiment 5 of the present invention.

FIGS. 13 and 14 are flowcharts showing procedures of the judgment processing and the determination processing performed by the controller 10 of the cell phone 1 according to the embodiment 5 of the present invention.

The controller 10 of the cell phone 1 extracts positional information within a predetermined time from the positional information stored in a storage section 11 (step S501) and temporarily stores in the storage section 11 a total number "k" of the extracted positional information and a number "L" of the positional information whose TRCs are below the predetermined value C, through the following processing (step S502). In addition, the controller 10 of the cell phone 1 assigns 0 into "L" as an initial value in step S502.

The controller 10 of the cell phone 1 applies processing of steps S503 to S510 described below to the positional information extracted in step S501. The processing of steps S503 to S510 is similar to the processing of steps S201 to S208 shown in FIGS. 7 and 8 in the embodiment 2, and therefore detailed description thereof is not given.

When the controller 10 of the cell phone 1 judges that the index value TRC is below the predetermined value C in step S510 (S510: YES), the controller 10 adds "1" to the number "L" of the positional information whose TRCs are below the predetermined value C (step S511). When the index value TRC is judged that the index value TRC is the predetermined value C or more (S510: NO), the processing is advanced to the next step.

Next, the controller 10 of the cell phone 1 judges whether or not positional information $P_{i+1}$ subsequent to interest positional information $P_i$ is the last one of the positional information extracted in step S501, in accordance with the fact (i=MAX(i)−1) whether or not the number "i" is a numerical value smaller by 1 than a maximum value (step S512).

When the controller 10 of the cell phone 1 does not judge that "i" is a numerical value smaller by 1 than the maximum value (S512: NO), the processing is returned to step S504. The judgment processing and the determination processing are then continued with subsequent positional information being set as next interest positional information.

Meanwhile, when the controller 10 of the cell phone 1 judges that "i" is a numerical value smaller by 1 than the maximum value (S512: YES), the controller 10 judges whether or not the ratio of the number "L" of the positional information whose TRCs are below the predetermined value C with respect to the total number "k" of the extracted positional information is larger than the predetermined probability Pc (step S513).

When the controller 10 of the cell phone 1 judges that the ratio is larger than the predetermined probability Pc (S513: YES), the controller 10 determines the entire positional information extracted in step S501 to be positional information including error and stores it as invalid positional information (step S514), and the processing is ended. Note that, even when positional information is determined to include error, the positional information may not be eliminated from the storage section 11. Such positional information may be corrected or complemented with using another positional information.

When the controller 10 of the cell phone 1 judges that the ratio is smaller than the predetermined probability Pc (S513: NO), the processing is just ended.

Thus, it is possible to calculate the index value TRC of the respective interest positional information for the time-sequential positional information corresponding to a predetermined time. Therefore, it is possible to determine an area corresponding to the extracted positional information to be a range including much error, when there is a large existence ratio of the positional information whose TRCs are judged to be below the predetermined value C.

The controllers 10 of the cell phones 1 according to embodiments 1 to 5 read out immediately previous information $P_{i-1}$ as the positional information time-sequentially previous to the interest positional information $P_i$ and read out immediately subsequent information $P_{i+1}$ as the positional information time sequentially subsequent to the interest positional information $P_i$. However, the present invention is not limited to the immediately previous and subsequent positional information. Time-sequentially preceding positional information may be used as the previous positional information, which is near the interest positional information. Similarly, time-sequentially following positional information may be used as the subsequent positional information, which is near the interest positional information. In addition, the previous positional information and the subsequent positional information may not be symmetrical in time-sequential and anteroposterior manner, with respect to the interest positional information.

Further, the controllers 10 of the cell phones 1 according to embodiments 1 to 5 judge the amplitude of fluctuation representing a direction of change between the previous positional information and the subsequent positional information transmitted from the GPS transmitters 13, and the controllers 10 determine error. However, the present invention is not limited thereto, and the GPS receiver 13 may execute a position detecting method according to the present invention and perform the processing performed by the controllers 10 of the cell phones 1 according to the embodiments 1 to 5. In this case, the GPS receiver 13 determines error in the detected positional information, deletes, corrects, or complements the positional information including error, and transmits the positional information after deletion, correction, or complementation, to the controller 10. When the GPS receiver 13 is configured with an LSI (Large Scale Integration) which incorporates a function of executing the position detecting method according to the present invention, such configuration lead excellent effects of implementing high-speed processing and further miniaturization.

Further, the controllers 10 of the cell phones 1 in the embodiments 1 to 5 perform the processing of determining error of the positional information. However, the present invention is not limited thereto, and the present invention can be applied to a position display system that includes: a server apparatus connected to the cell phone 1 through a base station BS and a packet exchange network; and a terminal apparatus having a display section connected to the server apparatus through the packet exchange network. In this case, it is also acceptable that the controller 10 of the cell phone 1 transmits a positional information detected by the GPS receiver 13 to the server apparatus through the base station BS. And then, the server apparatus may perform for the received positional information the processing of judging the amplitude of fluctuation representing a direction of change among information anteroposterior to the interest positional information and the processing of determining error, while those processing are performed by the controller of the cell phone in the embodiments 1 to 5, and the received positional information may be stored after being eliminated the positional information including error. Further, it is also acceptable that the server apparatus only receives and stores the positional information transmitted from the cell phone 1. And then, the terminal apparatus for displaying the moving locus of the cell phone 1 may acquire the positional information of the cell phone 1 from the server apparatus and perform the judgment processing and the determination processing of error for each positional information, while those processing are performed by the controller of the cell phone in the embodiments 1 to 5, and the moving locus may be displayed after the positional information including error is removed, corrected, and complemented.

Further, it is also possible that removing, correcting, complementing, or the like is not performed when false information and error information are determined, and alternatively that non-consecutiveness can be regarded as an attribute showing a characteristic of the information.

According to the present invention, even when a measurement accuracy differs in accordance with the environment of the location of the cell phone 1, it is possible to determine whether or not each positional information is error through the determination whether or not the detected positional information include error. Further, it is possible to determine whether or not the detected positional information includes the area having a large difference. Furthermore, the present invention can also be applied as a filtering for estimating accurate positional information, with correcting or complementing the positional information determined to include error.

Moreover, according to the present invention, the shift trend of the variables with respect to the elapse of time is quantitatively expressed by index values such as TC and TRC. With considering a distribution of the index values over the elapse of time and analyzing this distribution, it is possible to judge that, during the time when the index values show a constant trend, such as increase, decrease, and uniform, the time-sequential shift of the positional information is an allowable shift, namely, a shift having a predetermined directivity. Specifically, when detected positional information of the cell phone 1 at a certain point shifts from the anteroposterior positional information, it is possible to determine whether this shift is caused by erroneous detection of the positional information or caused by actual movement of the cell phone 1 in a constant direction. With utilizing this configuration, it is also possible to judge a moving state of the cell phone 1 with respect to the elapse of time. In other words, it is possible to judge whether or not the cell phone 1 is moved in some directions, whether or not the cell phone 1 is stopped, and even whether or not the cell phone 1 is moved with high speed. Furthermore, it is possible to specify the time point when a person carrying the cell phone 1 or an object loaded with the cell phone 1 starts movement to a destination.

The position detector of the present invention is an apparatus for determining positional information including error through analyzing the positional information with respect to the elapse of time. However, the present invention is not limited to the determination of error in two-dimensional or three-dimensional positional information with respect to the elapse of time referred to as one-dimensional variables (scalar). For example, the present invention can be applied in order to discriminate data including error from data that naturally change consecutively with a certain trend of an attribute in the respective coordinate of a two-dimensional or three-dimensional space, such as a magnetic field, electric field, voltage value, current value, temperature, humidity, acceleration, pressure, distortion, pH, weight of a chemical substance, or a color.

For example, because color information representing an object and an event in nature is rarely varied with large degree between adjacent coordinate, the present invention may be applied to one-dimensional shading information with respect to a planar surface referred to as a two-dimensional variable, or applied to three-dimensional color information (such as RGB or YCbCr) with respect to a planar surface referred to as a two-dimensional variable. Therefore, it is possible, through applying the present invention to image information, that color information at a coordinate having extremely different direction of change for color information is determined to include error information due to a measuring system or false information, removed, corrected, or is complemented with the neighboring color information.

It is possible to determine error for the color information of coordinate in image information. Further, it is possible to determine color information stored as invalid information can be determined to be noise and possible to eliminate such color information. In addition, it is possible to evaluate consecutiveness and non-consecutiveness of the shift trend of the color information in the image. Furthermore, it is possible to judge about type of image for each area. For example, it is possible to judge whether or not the image is natural object or event, whether or not the image is non-consecutive high frequency components such as characters, or the like. Moreover, it is possible to extract an area including much information determined to be error.

In addition, it is possible to apply the apparatus and the method of the present invention to observed value for social phenomenon that can be treated statistically, such as observed value for a model of human flow or economic flow, as well as observed value for natural phenomenon, such as a color, temperature, speed, magnetic field, and an electric field. Therefore, it is possible to apply the apparatus and the method of the present invention to, for example, time-sequential change of various economic barometers.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A data determination apparatus, comprising:
    a judgment unit that judges whether or not an amplitude of fluctuation representing a direction of change between a shift from a first data among plural data representing sequential situations of an object to an interest data to be processed representing a situation sequentially later than a situation represented by the first data among the plural data and a shift from the interest data to a second data among the plural data representing a situation sequentially later than the situation represented by the interest data to be processed is larger than a predetermined value;
    a first vector calculation unit that calculates a first vector representing a shift from a variable shown by the first data to a variable shown by the interest data;
    a second vector calculation unit that calculates a second vector representing a shift from the variable shown by the interest data to a variable shown by the second data;
    a dot product calculation unit that calculates a dot product of the first vector calculated by the first vector calculation unit and the second vector calculated by the second vector calculation unit; and
    a determination unit that determines whether or not the interest data representing a situation of the object is unreliable;
    wherein
    the judgment unit judges that the amplitude of fluctuation is larger than the predetermined value, when the dot product calculated by the dot product calculation unit is smaller than a given value; and
    the determination unit determines that the interest data is unreliable, when the judgment unit judges that the amplitude of fluctuation is larger than the predetermined value.

2. A data determination apparatus according to claim 1, further comprising:
    a detection unit that detects a position of a movable body, time-sequentially; wherein
    the plural data correspond to positional information based on the position detected by the detection unit;
    the first data corresponds to positional information time-sequentially preceding to the second data; and
    the determination unit determines that the interest data is error as information representing the position of the movable body, when the judgment unit judges that the amplitude of fluctuation is larger than the predetermined value.

3. A data determination apparatus according to claim 2, further comprising:
    a dividing correction unit that corrects the dot product calculated by the dot product calculation unit, through dividing by elapsed time since a time point corresponding to a positional information based on the first data until a time point corresponding to a positional information based on the interest data and dividing by elapsed time since the time point corresponding to the positional information based on the interest until a time point corresponding to the positional information based on the second data;
    wherein
    the judgment unit judges that the amplitude of fluctuation is larger than the predetermined value, when the dot product being corrected by the dividing correction unit is less than a given value.

4. A data determination apparatus according to claim 3, further comprising:
    an extracting unit that extracts a plurality of the first data and a plurality of the second data; and
    a mean value calculation unit that calculates a mean value of the dot product corrected by the dividing correction unit, for each set of the first data and the second data extracted by the extracting unit; wherein the first vector calculation unit and the second vector calculation unit calculates vectors, for the each set of the first data and the second data extracted by the extracting unit; and the judgment unit judges that the amplitude of fluctuation is larger than the predetermined value, when the mean value calculated by the mean value calculation unit, instead of the dot product being corrected by the dividing correction unit, is less than a given value.

5. A data determination apparatus according to claim 3, further comprising:
a ratio calculation unit that calculates, with respect to an entirety of data extracted by the extracting unit, a ratio of the data whose dot product being corrected by the dividing correction unit is judged to be less than the given value by the judgment unit;
wherein
the judgment unit judges that the amplitude of fluctuation is larger than the predetermined value for the entirety of data extracted by the extracting unit, when the ratio calculated by the ratio calculation unit is not less than a predetermined ratio; and
the determination unit determines that data are error for the entirety of data extracted by the extracting unit, when the amplitude of fluctuation is judged to be larger than the predetermined value for the entirety of data extracted by the extracting unit.

6. A data determination apparatus according to claim 1, further comprising:
a storage that stores the interest data determined to be an error data by the determination unit as being an invalid data.

7. A data determination apparatus according to claim 1, further comprising:
a computation unit that computes a median value or a mean value of multiple data that are time-sequentially in neighborhood of the interest data determined to be an error data by the determination unit; and
a correction unit that corrects the interest data determined to be an error data by the determination unit, with using the median value or the mean value computed by the computation unit.

8. A data determination apparatus according to claim 1, further comprising:
an extracting unit that extracts a plurality of the first data and a plurality of the second data;
a multiplication unit that multiply elapsed time since a time point corresponding to a positional information based on the first data until a time point corresponding to a positional information based on the interest data by elapsed time since the time point corresponding to the positional information based on the interest until a time point corresponding to the positional information based on the second data; and
a correlation coefficient calculation unit that calculates a correlation coefficient between the dot product calculated by the dot product calculation unit and the multiplied results by the multiplication unit, for each set of the plurality of the first data and the plurality of the second data extracted by the extracting unit;
wherein
the judgment unit judges that the amplitude of fluctuation is larger than the predetermined value, when the correlation coefficient calculated by the correlation coefficient calculation unit is less than a given value.

9. A data determination apparatus according to claim 1, wherein the interest data is an estimated position, the first data is a previously estimated position and the second data is a later estimated position.

10. A data determination apparatus according to claim 1, wherein when the determination unit determines that the interest data is unreliable, the interest data is removed.

11. A data determination method for determining whether a data is unreliable or not, the method being implemented on a device, said device comprising a controller configured to perform the method, said method comprising the steps of:
selecting an interest data to be processed among plural of data;
calculating a first vector representing a shift from a variable shown by a first data among the plural data representing sequential situations of an object to a variable shown by the selected interest data representing a situation sequentially later than a situation represented by the first data;
calculating a second vector representing a shift from the variable shown by the selected interest data to a variable shown by a second data among the plural data representing a situation sequentially later than the situation represented by the interest data to be processed;
calculating a dot product of the first vector and the second vector;
judging whether or not an amplitude of fluctuation representing a direction of change between a shift from the first data to the interest data and a shift from the interest data to the second data is larger than a predetermined value, in accordance with the calculated dot product; and
determining that the selected interest data to be processed representing a situation of the object is unreliable, when the amplitude of fluctuation is judged to be larger than the predetermined value.

12. A data determination method according to claim 11, further comprising the step of:
detecting a position of a movable body, time-sequentially; wherein
the plural data correspond to positional information based on the detected position;
the first data corresponds to positional information time-sequentially preceding to the second data; and
the selected interest data is determined to be unreliable as information representing the position of the movable body, when the amplitude of fluctuation is judged to be larger than the predetermined value.

13. A non-transitory computer readable medium having stored thereon computer executable program for determining whether a data is unreliable or not, wherein
the computer program when executed causes a computer system to execute steps of:
selecting an interest data to be processed among plural data;
calculating a first vector representing a shift from a variable shown by a first data among the plural data representing sequential situations of an object to a variable shown by the selected interest data representing a situation sequentially later than a situation represented by the first data;
calculating a second vector representing a shift from the variable shown by the selected interest data to a variable shown by a second data among the plural data representing a situation sequentially later than the situation represented by the interest data to be processed;
calculating a dot product of the first vector and the second vector;

judging whether or not an amplitude of fluctuation representing a direction of change between a shift from the first data to the interest data and a shift from the interest data to the second data is larger than a predetermined value, in accordance with the calculated dot product; and determining that the selected interest data to be processed representing a situation of the object is unreliable, when the amplitude of fluctuation is judged to be larger than the predetermined value.

14. A non-transitory computer readable medium according to claim 13, wherein the computer program causes the computer system to execute further the step of detecting a position of a movable body, time-sequentially, wherein the plural data correspond to positional information based on the detected position;

the first data corresponds to positional information time-sequentially preceding to the second data; and the selected interest data is determined to be unreliable as information representing the position of the movable body, when the amplitude of fluctuation is judged to be larger than the predetermined value.

* * * * *